United States Patent
Khanal et al.

(10) Patent No.: US 9,729,416 B1
(45) Date of Patent: Aug. 8, 2017

(54) ANOMALY DETECTION USING DEVICE RELATIONSHIP GRAPHS

(71) Applicant: ExtraHop Networks, Inc., Seattle, WA (US)

(72) Inventors: Bhushan Prasad Khanal, Seattle, WA (US); Xue Jun Wu, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 15/207,213

(22) Filed: Jul. 11, 2016

(51) Int. Cl.
*H04L 12/26* (2006.01)
*H04L 29/08* (2006.01)
*H04L 29/06* (2006.01)

(52) U.S. Cl.
CPC ...... *H04L 43/0823* (2013.01); *H04L 43/0876* (2013.01); *H04L 43/16* (2013.01); *H04L 67/1044* (2013.01); *H04L 69/16* (2013.01)

(58) Field of Classification Search
None
See application file for complete search history.

(56) References Cited

U.S. PATENT DOCUMENTS

| | | |
|---|---|---|
| 5,027,269 A | 6/1991 | Grant |
| 5,430,727 A | 7/1995 | Callon |
| 5,541,995 A | 7/1996 | Normile et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,405,250 B1 | 6/2002 | Lin et al. |
| 6,412,000 B1 | 6/2002 | Riddle et al. |
| 6,526,044 B1 | 2/2003 | Cookmeyer, II et al. |

(Continued)

OTHER PUBLICATIONS

Official Communication for U.S. Appl. No. 12/326,672 mailed on Jun. 9, 2010 (9 pages).

(Continued)

*Primary Examiner* — Ninos Donabed
(74) *Attorney, Agent, or Firm* — John W. Branch; Lowe Graham Jones PLLC

(57) ABSTRACT

Embodiments are directed to monitoring network traffic in a network. A device relation model that may be comprised of two or more nodes and one or more edges stored in memory of the network computer may be provided to a network monitoring computer (NMC), such that each node represents an agent and each edge represents a relationship between two agents. If error signals are detected by the NMC, the NMC perform further actions to process the error signals. The device relation model may be traversed to identify agents associated with the error signals. The network traffic associated with the error signals and the agents may be analyzed by the NMC. If the error signals are associated with anomalies in the network traffic, users may be notified. The device relation model may be updated upon discovery of new computing devices, new applications, or new associations between agents.

26 Claims, 14 Drawing Sheets

(56) References Cited

U.S. PATENT DOCUMENTS

| | | |
|---|---|---|
| 6,560,636 B2 | 5/2003 | Cohen et al. |
| 6,704,311 B1 | 3/2004 | Chuah et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,999,729 B2 | 2/2006 | Wandel |
| 7,042,888 B2 | 5/2006 | Berggreen |
| 7,089,326 B2 | 8/2006 | Boucher et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,474,654 B2 | 1/2009 | Guru |
| 7,480,292 B2 | 1/2009 | Busi et al. |
| 7,535,906 B2 | 5/2009 | Engbersen et al. |
| 7,545,499 B2 | 6/2009 | Overbeck et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,774,456 B1 | 8/2010 | Lownsbrough et al. |
| 7,864,764 B1 | 1/2011 | Ma et al. |
| 7,916,652 B1 | 3/2011 | Lima et al. |
| 7,979,555 B2 | 7/2011 | Rothstein et al. |
| 8,040,798 B2 * | 10/2011 | Chandra ............ H04L 41/0846 370/229 |
| 8,079,083 B1 | 12/2011 | Bennett et al. |
| 8,125,908 B2 | 2/2012 | Rothstein et al. |
| 8,185,953 B2 | 5/2012 | Rothstein et al. |
| 8,411,677 B1 | 4/2013 | Colloff |
| 8,619,579 B1 | 12/2013 | Rothstein et al. |
| 9,426,036 B1 * | 8/2016 | Roy ................. H04L 43/0882 |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0107953 A1 | 8/2002 | Ontiveros et al. |
| 2002/0133586 A1 | 9/2002 | Shanklin et al. |
| 2002/0152209 A1 | 10/2002 | Merugu et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0233361 A1 | 12/2003 | Cady |
| 2004/0003094 A1 | 1/2004 | See |
| 2004/0047325 A1 | 3/2004 | Hameleers et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0125553 A1 | 6/2005 | Wu et al. |
| 2005/0182833 A1 | 8/2005 | Duffie et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0106743 A1 * | 5/2006 | Horvitz ............... G06N 99/005 706/21 |
| 2006/0123477 A1 | 6/2006 | Raghavan et al. |
| 2006/0174343 A1 | 8/2006 | Duthie et al. |
| 2006/0184535 A1 | 8/2006 | Kaluskar et al. |
| 2006/0230456 A1 | 10/2006 | Nagabhushan et al. |
| 2007/0039051 A1 | 2/2007 | Duthie et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0192863 A1 | 8/2007 | Kapoor et al. |
| 2007/0239639 A1 | 10/2007 | Loughmiller et al. |
| 2007/0245420 A1 * | 10/2007 | Yong ..................... H04L 41/28 726/23 |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas |
| 2008/0069002 A1 | 3/2008 | Savoor et al. |
| 2008/0130659 A1 | 6/2008 | Polland |
| 2008/0141275 A1 | 6/2008 | Borgendale et al. |
| 2008/0147818 A1 | 6/2008 | Sabo |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2009/0010259 A1 | 1/2009 | Sirotkin |
| 2009/0034426 A1 | 2/2009 | Luft et al. |
| 2009/0168657 A1 | 7/2009 | Puri et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 * | 10/2009 | Campbell ............... H04L 41/12 370/216 |
| 2009/0296593 A1 | 12/2009 | Prescott |
| 2010/0091770 A1 | 4/2010 | Ishikawa |
| 2010/0095367 A1 | 4/2010 | Narayanaswamy |
| 2010/0250928 A1 | 9/2010 | Goto |
| 2010/0299158 A1 | 11/2010 | Siegel |
| 2010/0316216 A1 | 12/2010 | Fukushima et al. |
| 2010/0322248 A1 | 12/2010 | Ivanov |
| 2011/0019574 A1 | 1/2011 | Malomsoky et al. |
| 2011/0073490 A1 | 3/2011 | Hayamizu et al. |
| 2011/0280149 A1 | 11/2011 | Okada et al. |
| 2011/0320394 A1 * | 12/2011 | McKeown ............ H04L 41/12 706/47 |
| 2012/0130745 A1 | 5/2012 | Jones |
| 2012/0166962 A1 | 6/2012 | Lunsford |
| 2012/0176917 A1 | 7/2012 | Matityahu et al. |
| 2012/0215328 A1 | 8/2012 | Schmelzer |
| 2012/0243533 A1 | 9/2012 | Leong |
| 2012/0294305 A1 | 11/2012 | Rose et al. |
| 2013/0010608 A1 | 1/2013 | Ramachandran et al. |
| 2013/0042323 A1 | 2/2013 | Narayanaswamy |
| 2013/0064084 A1 | 3/2013 | Babbar et al. |
| 2013/0103734 A1 | 4/2013 | Boldyrev et al. |
| 2013/0166730 A1 | 6/2013 | Wilkinson |
| 2013/0176842 A1 * | 7/2013 | Bauchot ............... H04L 41/0627 370/216 |
| 2013/0232104 A1 | 9/2013 | Goyal et al. |
| 2013/0305357 A1 * | 11/2013 | Ayyagari ............. H04L 63/14 726/22 |

(56) References Cited

U.S. PATENT DOCUMENTS

| | | | |
|---|---|---|---|
| 2014/0040451 A1 | 2/2014 | Agrawal et al. | |
| 2014/0077956 A1 | 3/2014 | Sampath et al. | |
| 2014/0142972 A1 | 5/2014 | Hosenfeld, Jr. | |
| 2014/0222998 A1* | 8/2014 | Vasseur | H04L 41/16 709/224 |
| 2014/0304211 A1* | 10/2014 | Horvitz | G06N 99/005 706/52 |
| 2015/0134554 A1* | 5/2015 | Clais | G06Q 10/1053 705/321 |
| 2015/0199613 A1* | 7/2015 | Ruiz | G06N 7/005 706/11 |
| 2015/0229661 A1* | 8/2015 | Balabine | H04L 43/04 726/22 |
| 2015/0249512 A1* | 9/2015 | Adimatyam | H04H 20/12 725/107 |
| 2015/0331771 A1* | 11/2015 | Conway | H04W 24/08 714/704 |
| 2016/0219066 A1* | 7/2016 | Vasseur | H04L 63/1425 |

OTHER PUBLICATIONS

Official Communication for U.S. Appl. No. 12/326,672 mailed on Dec. 23, 2010 (15 pages).
Official Communication for U.S. Appl. No. 12/326,672 mailed on Jun. 22, 2011 (16 pages).
Official Communication for U.S. Appl. No. 12/326,672 mailed on Oct. 24, 2011 (9 pages).
Lin, Mark, "An Overview of Session Hijacking at the Network and Application Levels," Jan. 18, 2005 (16 pages).
U.S. Appl. No. 11/683,643, entitled "Detecting Anomalous Network Application Behavior", by Jesse Abraham Rothstein and Arindum Mukerji, filed Mar. 8, 2007 (40 pages).
U.S. Appl. No. 11/679,356, entitled "Capture and Resumption of Network Application Sessions", by Jesse Abraham Rothstein and Arindurn Mukerji, filed Feb. 27, 2007 (37 pages).
Official Communication for U.S. Appl. No. 11/683,643 mailed on Apr. 28, 2010 (35 pages).
Official Communication for U.S. Appl. No. 11/683,643 mailed on Oct. 14, 2010 (43 pages).
Official Communication for U.S. Appl. No. 11/683,643 mailed on Aug. 25, 2011 (43 pages).
Official Communication for U.S. Appl. No. 11/683,643 mailed on Jan. 23, 2012 (6 pages).
Official Communication for U.S. Appl. No. 13/831,626, mailed Sep. 3, 2013, (17 pages).
Official Communication for U.S. Appl. No. 13/831,673 mailed on Sep. 30, 2013, (10 pages).
Official Communication for U.S. Appl. No. 13/831,673 mailed on Mar. 6, 2014, (12 pages).
Official Communication for U.S. Appl. No. 13/831,673 mailed on May 22, 2014, (5 pages).
Official Communication for U.S. Appl. No. 14/518,996 mailed on Nov. 20, 2014, (41 pages).
Official Communication for U.S. Appl. No. 13/831,908 mailed on Jun. 25, 2014, (15 pages).
Official Communication for U.S. Appl. No. 14/500,893 mailed on Nov. 20, 2014, (15 pages).
Official Communication for U.S. Appl. No. 13/831,908 mailed on Apr. 9, 2014, (3 pages).
Official Communication for U.S. Appl. No. 13/831,908 mailed on Aug. 9, 2013, (29 pages).
Official Communication for U.S. Appl. No. 13/831,908 mailed on Jan. 13, 2014, (31 pages).
Official Communication for U.S. Appl. No. 14/107,631 mailed on Dec. 30, 2014, (12 pages).
Handel et al. "Hiding Data in the OSI Network Model," Los Alamos, New Mexico, 1996, (16 pages).
Official Communication for U.S. Appl. No. 14/107,631 mailed on Feb. 20, 2014, (16 pages).
Official Communication for U.S. Appl. No. 14/107,631 mailed on Sep. 26, 2014, (14 pages).
Handley et al., "Network Intrusion Detection: Evasion, Traffic Normalization, and End-to-End Protocol Semantics," 2011, International Computer Science Institute, (17 pages).
Information Sciences Institute, "Internet Protocol Darpa Internet Program Protocol Specification," Sep. 1981, (36 pages).
Fuertes, "Evaluation of OSPF Extensions in MANET Routing," Paris, 2007, (192 pages).
Parsons, "Moving Across the Internet: Code-Bodies, Code-Corpses, and Network Architecture," May 9, 2010, (20 pages).
Zander et al., "Covert Channels and Countermeasures in Computer Network Protocols," Dec. 2007, (7 pages).
Official Communication for U.S. Appl. No. 14/500,893 mailed on Feb. 18, 2015, (11 pages).
Official Communication for U.S. Appl. No. 14/107,580 mailed on Mar. 6, 2014, (13 pages).
Official Communication for U.S. Appl. No. 14/107,580 mailed on Sep. 15, 2014, (15 pages).
Official Communication for U.S. Appl. No. 14/107,580 mailed on Mar. 17. 2015, (5 pages).
Official Communication for U.S. Appl. No. 11/679,356 mailed on Jun. 22, 2009, (21 pages).
Official Communication for U.S. Appl. No. 11/679,356 mailed on Dec. 11, 2009, (23 pages).
Official Communication for U.S. Appl. No. 11/679,356 mailed on Feb. 22, 2010, (3 pages).
Official Communication for U.S. Appl. No. 11/679,356 mailed on Sep. 9, 2010, (7 pages).
Official Communication for U.S. Appl. No. 11/679,356 mailed on Mar. 4, 2011, (15 pages).
Official Communication for U.S. Appl. No. 15/014,932 mailed on Jun. 10, 2016, (20 pages).
Official Communication for U.S. Appl. No. 15/014,932 mailed Dec. 14, 2016, 26 pages.
Digital Imaging and Communications in Medicine (DICOM), Part 6: Data Dictionary, PS 3.6-2011. 2011, http://dicom.nema.org/Dicom/2011 /11_06pu.pdf, 255 pages.
Health Level Seven, Version 2,6, Appendix A. Nov. 2007, https://www.hl7.org/special/committees/vocab/V26_Appendix_A.pdf, 216 pages.

\* cited by examiner

US 9,729,416 B1

ANOMALY DETECTION USING DEVICE RELATIONSHIP GRAPHS

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

Furthermore, as information technology infrastructure becomes more complex and more dynamic, there be numerous signals and/or metrics produced by the various different types of network monitors that may be monitoring these complex networks. The large number of signals and/or metrics may contribute to the difficulty in identifying anomalies in the network. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE EMBODIMENTS

Figure 1:
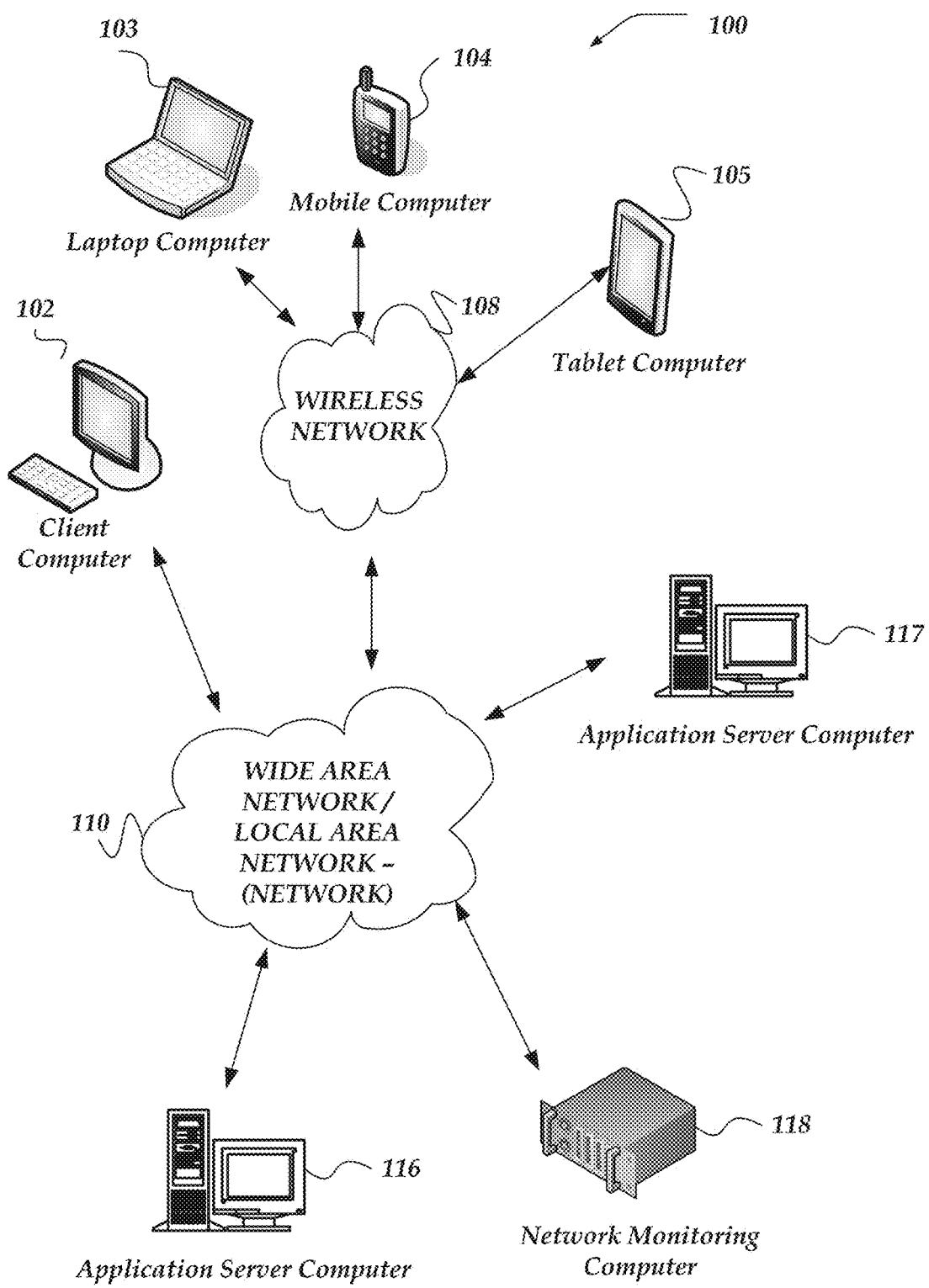
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VIOP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In at least one embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client and/or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated and/or applied over time to further classify the observed protocols. In some embodiments, NMCs may be arranged to employ stateful analysis. Accordingly, for each supported protocols, an NMD may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In at least one of the various embodiments, NMCs and/or NMC functionality may be implemented using hardware or software based proxy devices that may be arranged to intercept network traffic in the monitored networks.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from four to seven, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "agent" refers to an actor in the monitored network. Agents may include applications, services, programs, processes, network devices, or the like, operating in the monitored network. For example, individual agents may include, web clients, web servers, database clients, database servers, mobile app clients, payment processors, groupware clients, groupware services, or the like. In some cases, multiple agents may co-exist on the same network computer, process, application, or cloud compute instance.

As used herein, the term "device relation model" refers to a data structure that is used to represent relationships between and among different agents in a monitored network. Device relation models may be graph models comprised of nodes and edges stored in the memory of a network computer. In some embodiments, the network computer may automatically update the configuration and composition of the device relation model stored in the memory of the network computer to reflect the relationships between two or more agents in the monitored network. Nodes of the graph model may represent agents in the network and the edges of the graph model represent the relationship between agents in the network. Device relation models may improve the performance of computers at least by enabling a compact representation of agents and relationships in large networks to reduce memory requirements.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic in a network. In at least one of the various embodiments, a device relation model that may be comprised of two or more nodes and one or more edges stored in memory of the network computer may be provided to a network monitoring computer (NMC), such that each node represents an agent and each edge represents a relationship between two agents.

In at least one of the various embodiments, providing the device relation model, may include: adding one or more nodes to the device relation model based on the network traffic, wherein the one or more nodes each represent an agent in the network; and adding one or more edges to the device relation model based on the network traffic such that the one or more edges correspond to an association between two agents.

In at least one of the various embodiments, providing the device relation model may include: providing one or more weight values that may be associated with the one or more edges such that the one or more weight values may indicate a strength of an association between two agents; and removing one or more of the one or more edges from the device relation model that may be associated with a weight value that may be less than a defined threshold.

In at least one of the various embodiments, providing the device relation model may further include, if the network traffic from two or more non-associated agents may be correlated, one or more phantom edges may be added to the device relation model to associate the two or more non-associated agents with each other.

In at least one of the various embodiments, providing the device relation model, may also include: associating the one or more agents with applications based on their network traffic; and assigning the one or more agents to one or more groups based on their network traffic and their associated applications.

In at least one of the various embodiments, if one or more error signals may be detected by the NMC, the NMC may be arranged to perform further actions to process the error signals. In at least one of the various embodiments, the one or more error signals, may include monitored network traffic that is associated with one or more of application errors, timeouts, authentication errors, custom errors, or the like, or combination thereof. In at least one of the various embodiments, error signals are not limited to the application layer. In embodiments, error signals may correspond to potential problems at the networking level, such as, TCP retransmits, throttles, and other transport related problems that may be known to cause application stalls.

In at least one of the various embodiments, the device relation model may be traversed to identify one or more agents that may be associated with the one or more error signals such that the one or more agents may be associated with each other in the device relation model.

In at least one of the various embodiments, the network traffic associated with the one or more error signals and the one or more agents may be analyzed by one or more NMCs. In at least one of the various embodiments, analyzing the network traffic may further include: comparing a portion of the error signals that may be associated with one or more of the one or more agents with another portion of the error signals that may be associated with one or more other agents of the one or more agents; and associating the one or more error signals with the one or more anomalies of the network traffic based on a result of the comparison.

In at least one of the various embodiments, if the one or more error signals are determined to be associated with one or more anomalies in the network traffic, one or more users may be notified of the one or more anomalies in the network.

In at least one of the various embodiments, the device relation model may be updated based on the network, wherein the device relation model is updated upon a discovery of one or more of new computing devices in the network, new applications in the network, or new associations between agents.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Application Server Computer 116, Application Server Computer 117, Network monitoring computer 119, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, application server computer 117, network monitoring computer 118, or other computers.

Client computers 102-105 may further be configured to include a client application that enables an end-user to log into an end-user account that may be managed by another computer, such as application server computer 116, application server computer 117, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring computer 118. Also, client computers may be arranged to enable users to display reports, interactive user-interfaces, and/or results provided by network monitor computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, application server computer 117, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 and/or application server computer 117 is described in more detail below in conjunction with FIG. 3. Briefly, however, application server computer 116-117 includes virtually any network computer capable of hosting applications and/or providing services in network environment.

One embodiment of network monitoring computer 118 is described in more detail below in conjunction with FIG. 3. Briefly, however, network monitoring computer 118 may include include virtually any network computer capable of passively monitoring communication traffic in a network environment.

Although FIG. 1 illustrates application server computer 116, application server computer 117, and network monitor device 118, each as a single computer, the innovations and/or embodiments are not so limited. For example, one or more functions of application server computers 116-117, and/or network monitoring computer 118, or the like, may be distributed across one or more distinct network computers. Moreover, in at least one embodiment, network monitoring computer 118 may be implemented using a plurality of network computers. Further, in at least one of the various embodiments, application server computers 116-117, and/or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
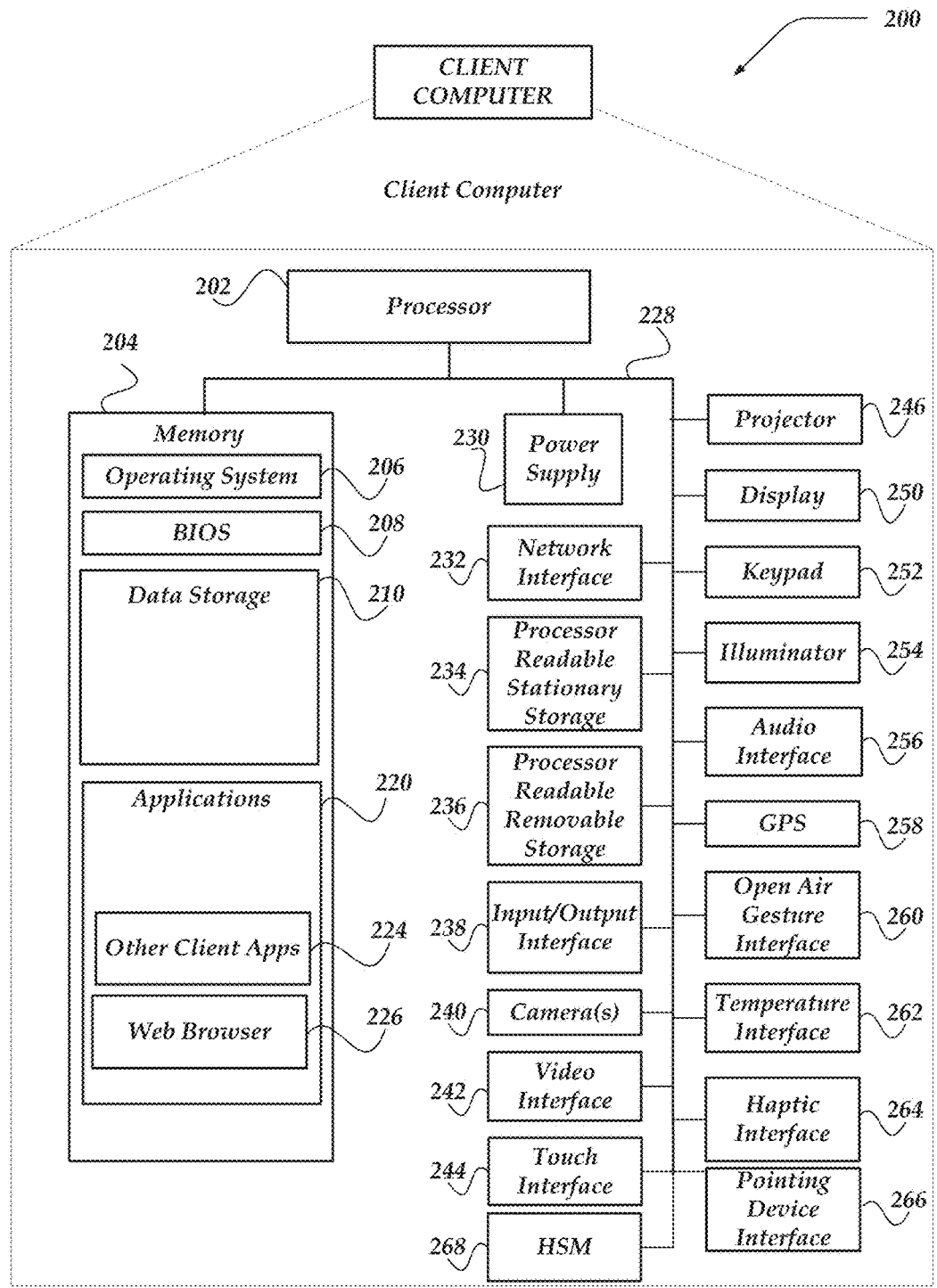
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
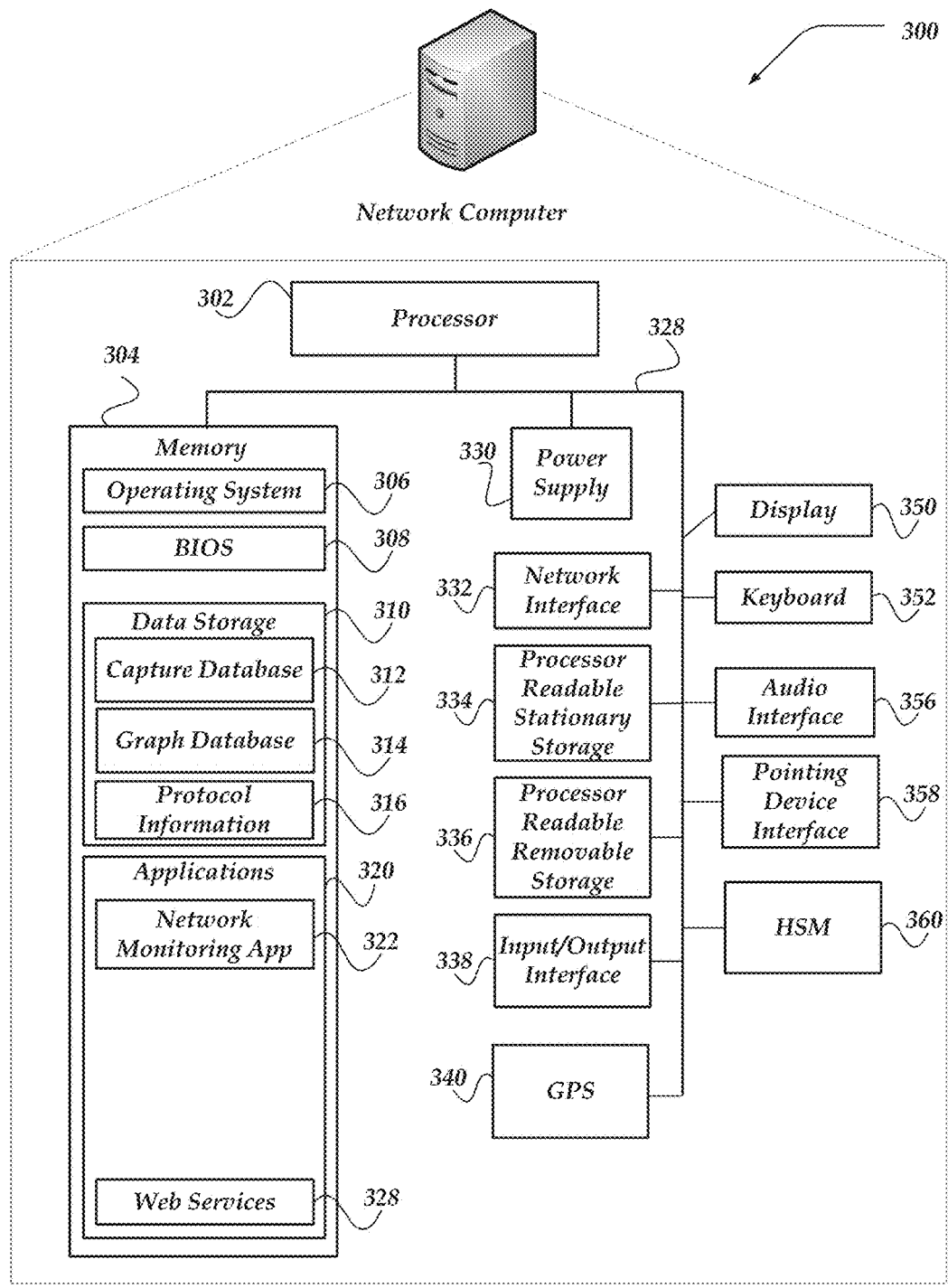
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computers 116-117 and/or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, capture database 312, graph database 314, protocol information 316, or the like. Capture database 312 may be a data store that contains one or more records, logs, events, or the like, produced during monitoring of the networks. Graph database 314 may be arranged to store one or more data structures that represent device relation models. And, protocol information 316 may store various rules and/or configuration information related to one or more network communication protocols (e.g., HL7) that may be employed, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring application 322 that perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, network monitoring application 322 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to network monitoring application 322 may be provisioned and de-commissioned automatically.

Also, in at least one of the various embodiments, network monitoring application 322, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), the network computer may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In at least one embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
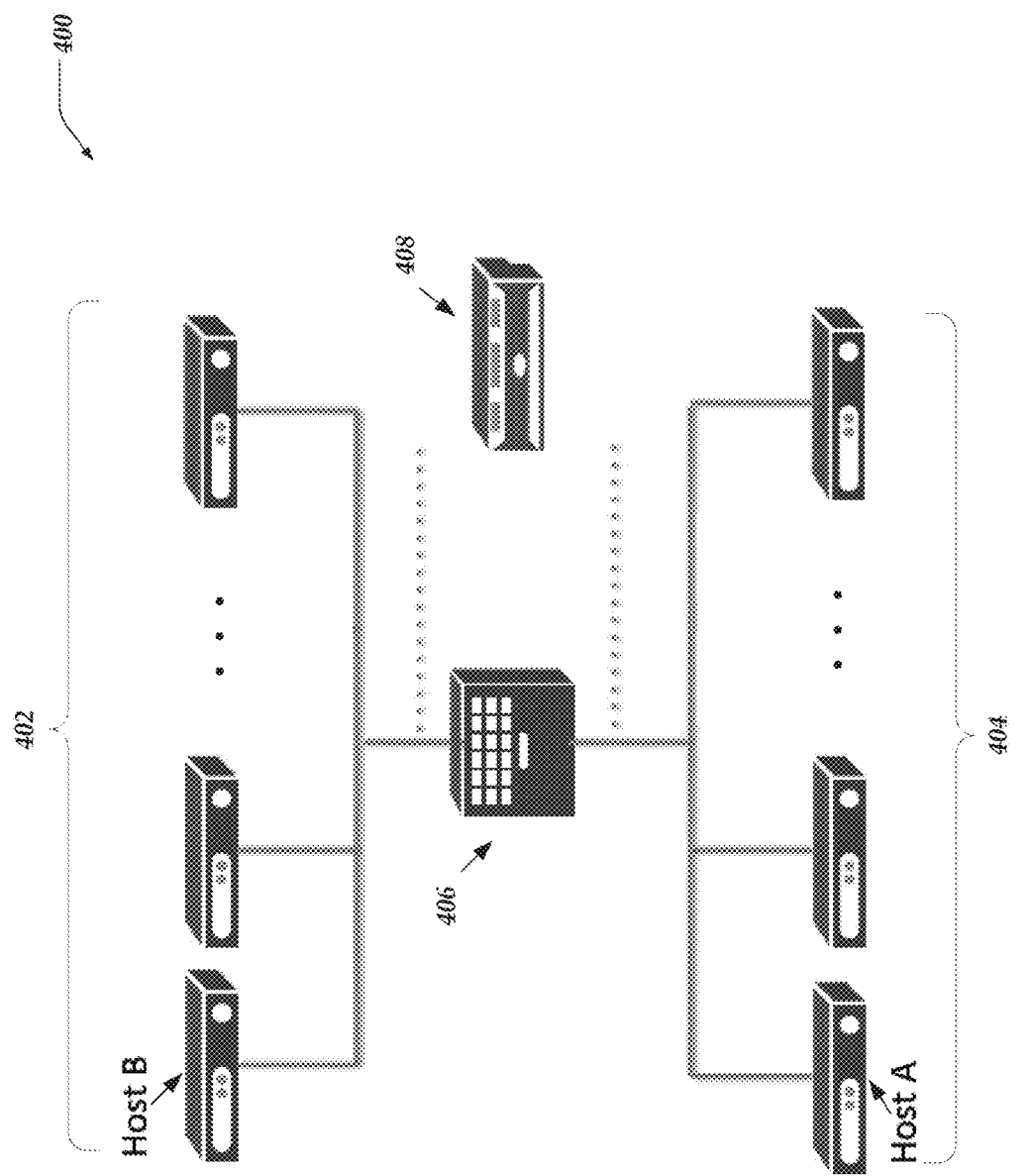
FIG. 4 illustrates a logical architecture of a system for anomaly detection using device relationship graphs in accordance with at least one of the various embodiments.

FIG. 4 illustrates a logical architecture of system 400 for anomaly detection using device relationship graphs in accordance with at least one of the various embodiments. System 400 may be arranged to include a plurality of network devices and/or network computers on first network 402 and a plurality of network devices and/or network computers on second network 404. Communication between the first network and the second network is managed by switch 406. Also, NMC 408 may be arranged to passively monitor and/or record packets (network packets) that are communicated in network connection flows between network devices and/or network computers on first network 402 and second network 404. For example, the communication of flows of packets between the Host B network computer and the Host A network computer are managed by switch 406 and NMC 408 may be passively monitoring and recording some or all of the network traffic comprising these flows.

Also, NMC 408 may be arranged to passively monitor network communication between and among hosts that are on the same network, such as, network computers 402.

NMC 408 may be arranged to receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

Figure 5:
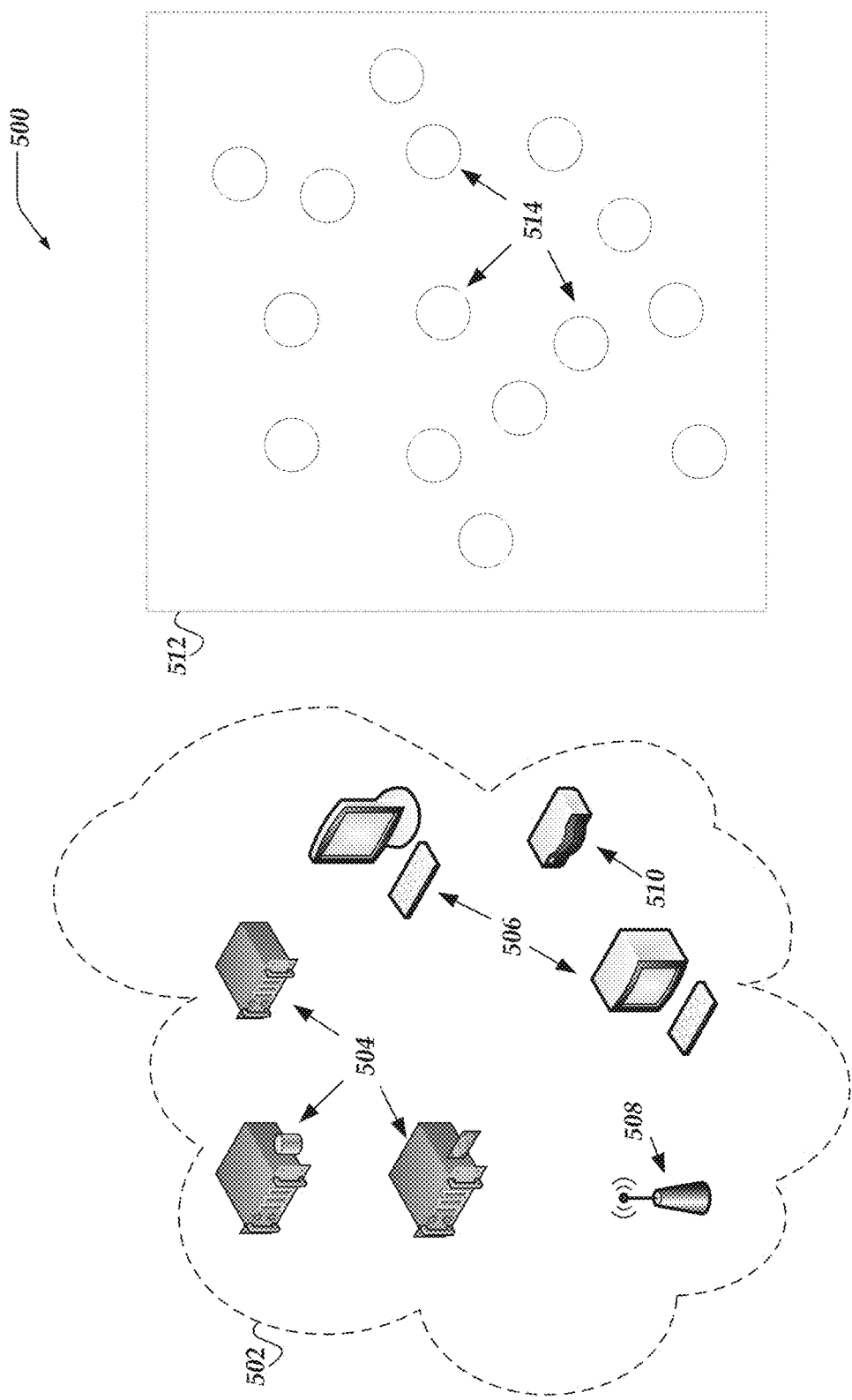
FIG. 5 illustrates a logical representation of a network in accordance with at least one of the various embodiments.

FIG. 5 illustrates a logical representation of network 500 in accordance with at least one of the various embodiments. In at least one of the various embodiments, network 502 represent a physical network and the objects in the network. In this example, network 502 includes, network computers 504, client computers 506, network devices, such as, network device 510, and other items, such as, WI-FI hotspot 508. One of ordinary skill in the art will appreciate that networks may have many more and/or different devices than shown in FIG. 5.

In at least one of the various embodiments, one or more network monitoring computers (NMCs) may be arranged to monitor networks, such as, network 502. (See, FIG. 4). In at least one of the various embodiments, NMCs may be arranged to generate a device relation model that represents the items in a network. For example, device relation model 512 represents a device relation model corresponding to network 502. Accordingly, device relation model 512 includes nodes that represent the various agents that may be active in network 502. For example, agents 514, may represent some of the agents that are operative in network 502. In some embodiments, there may be more agents in model 512 than the number of actual computers and network devices present in network 502 since many network computers/devices may host more than one agent.

In this example, device relation model 512 shows nodes that corresponds to agents absent any edges. In some embodiments, initially some or all of the relationships between the agents may be unknown to the monitoring NMC, so some or all of the edges may be unknown and therefor omitted from device relation model 512. Note, in at least one of the various embodiments, there may be pre-defined network architecture/topology information that may be available to the NMC. Accordingly, in some embodiments, the NMC may be able to determine some of the relationships between agents before observing network traffic.

Figure 6:
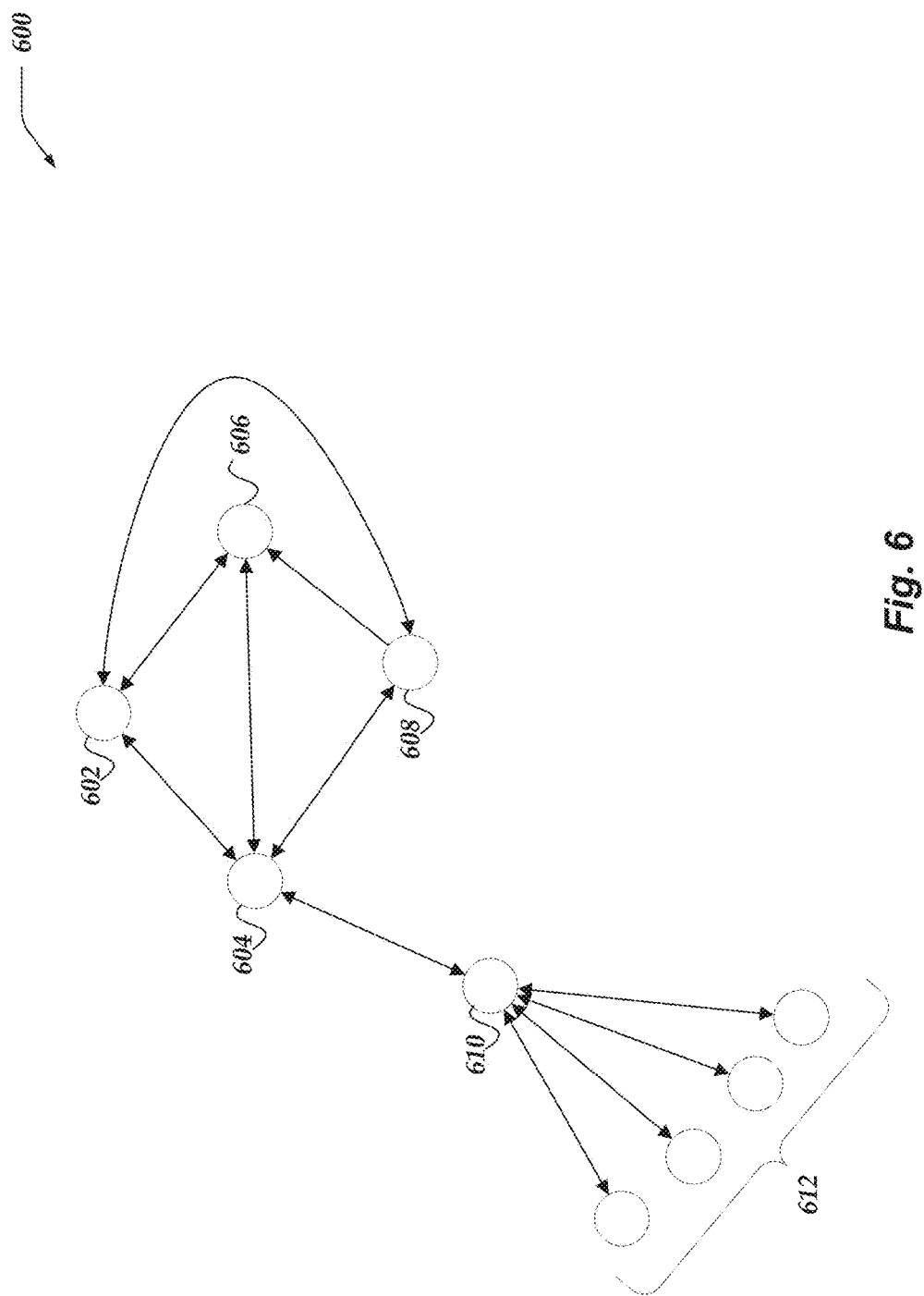
FIG. 6 illustrates a logical representation of a portion of a device relation model in accordance with at least one of the various embodiments.

FIG. 6 illustrates a logical representation of a portion of device relation model 600 in accordance with at least one of the various embodiments. In at least one of the various embodiments, device relation models may include nodes that represent agents and edges that represent relationships between the agents. In some embodiments, agents may represent servers, clients, switches, routers, NMCs, load balancers, or the like. For example, agent 602 may be a server agent that has relationships with other servers, such as, agent 604 and agent 606. Likewise, agent 608 may be a server or other service that has a relationship with agent 604, agent 606, and agent 602. Further, agent 604 and agent 610 may have a relationship and client agents 612 may have direct relationships with agent 610.

In at least one of the various embodiments, NMCs may be arranged to use device relation model 600 to discover relationships between groups of agents. For example, device relation model 600 may be used to determine that agent 602, agent 604, 610, and client 612 may be in a related group because they are all on the same path through the graph.

Figure 7B:
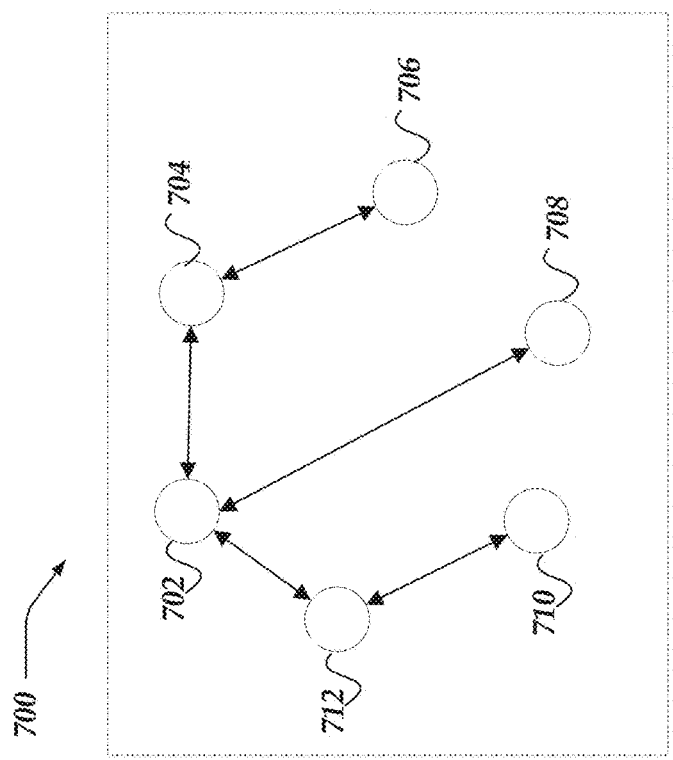
FIGS. 7A and 7B illustrate how a device relation model may evolve as the NMCs gather more information about the relationships between the agents in a network.
Figure 7A:
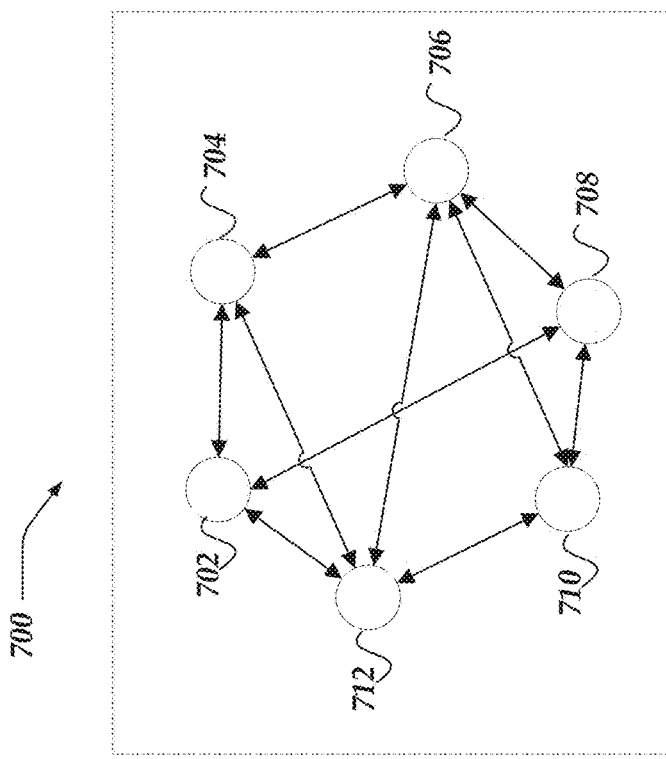

FIGS. 7A and 7B illustrate how a device relation model may evolve as the NMCs gather more information about the relationships between the agents in a network.

FIG. 7A illustrates a logical representation of device relation model 700 showing naïve relationships between the agents in accordance with the one or more embodiments. In at least one of the various embodiments, for example, a NMC may initially determine the agents in a network by observing the network traffic to obtain the source/destination network address fields in the network packets that flow through the network. In at least one of the various embodiments, each unique network address may represent a different agent in the network.

Likewise, in some embodiments, the NMC may be arranged to observe responses to broadcast messages, or the like. In some embodiments, the NMC may be provided other configuration that defines some or all of the agents in the network.

In this example, for at least one of the various embodiments, the NMC has discovered/identified six agents in the network (agent 702 through agent 712). Accordingly, in some embodiments, the NMC may be arranged to generate a device relation model, such as, device relation model 700 that represents the six discovered agents as nodes in the graph. Likewise, in some embodiments, edges in device relation model 700 may represent the initial relationships as determined by the NMC. For example, in the initial stages of monitoring a network the NMC may be arranged to determine relationships based on which agents are observed to be communicating with each other.

However, in at least one of the various embodiments, NMCs may be arranged to provide a device relation model that represents the relationships between the agents. Initially, in some embodiments, the NMC may define the initial relationships in the network based on which agents communicate with each other. However, in at least one of the various embodiments, as the NMC collects more information about the agents and their relationships to other agents, the NMC may modify device relation model 700 to reflect the deeper understanding of these relationships.

FIG. 7B illustrates a logical representation of device relation model 700 showing informed relationships between the agents in accordance with the one or more embodiments. In at least one of the various embodiments, after sufficient monitoring has occurred, the NMC may have observed enough network traffic to evaluate and weight the relationships of the agents in the network.

In at least one of the various embodiments, some of the initial relationships may be determined to be incidental, spurious, or otherwise unimportant. Accordingly, the NMC may be arranged to remove (or de-prioritize) edges from device relation model 700 that correspond to such relationships. For example, in at least one of the various embodiments, agents (e.g., Windows network domain controllers) in a network may be arranged to periodically exchange messages with one or more other agents for discovery/accountability purposes. Thus, in this example, some of the messaging observed by an NMC may be routing and otherwise not resulting from an interesting relationship between the sender and receiver.

In at least one of the various embodiments, NMC may be arranged to evaluate the communication between agents to attempt to determine the type of relationships and the importance of the relationships. Accordingly, in at least one of the various embodiments, NMCs may be arranged to collected metrics associated with the various network flows flowing the network to identify the flows that may be important. Likewise, in at least one of the various embodiments, NMC may be arranged discover and recognize the communication protocols used by agents in monitored networks. In some embodiments, the NMCs may be arranged to use the collected metrics and its understanding of the communication protocol to establish and/or prioritize relationships between the agents in the networks.

In this example, for at least one of the various embodiments, device relation model 700 has been modified to include relationships determined to be of importance. The nodes representing agents 702-712 are still present in but some of the edges that represent relationships in the network have been removed. For example, in FIG. 7A, device relation model 700 includes an edge between agent 704 and agent 712. In FIG. 7B, device relation model 700 omits the edge between agent 704 and agent 712.

In at least one of the various embodiments, the remaining edges in device relation model 700 represent relationships between the agents that the NMC determined to be important. Note, in at least one of the various embodiments, NMC may employ a variety of metrics, conditions, heuristics, or the like, to identify relationships that may be of interest. For example, an NMC may be arranged to identify agents that represent certain applications on the network, such as, database servers, database clients, email servers, email clients, or the like, by identifying the communication protocols that may be used by the particular applications. In other cases, the NMC may determine an important relationship based on the number and/or rate of packets exchanged between one or more agents. Accordingly, the NMC may be configured to prioritize relationships between agents that exchange a high volume of traffic.

In at least one of the various embodiments, the NMC may analyze observed traffic to identify network packets that flow through particular paths in the device relation model. In some embodiments, NMCs may be arranged to trace or identify such paths connecting related agents by observing common data carried in the payloads and/or header fields of the network packets that are passed among agents in the network. For example, an NMC may be arranged to observe sequence numbers, session identifiers, HTTP cookies, query values, or the like, from all agent participating in transactions on the network. In some embodiments, the NMC may correlate observed network packets that may be requests and responses based on the contents of the network packets and information about the operation of the underlying applications and/or protocols.

Figure 8B:
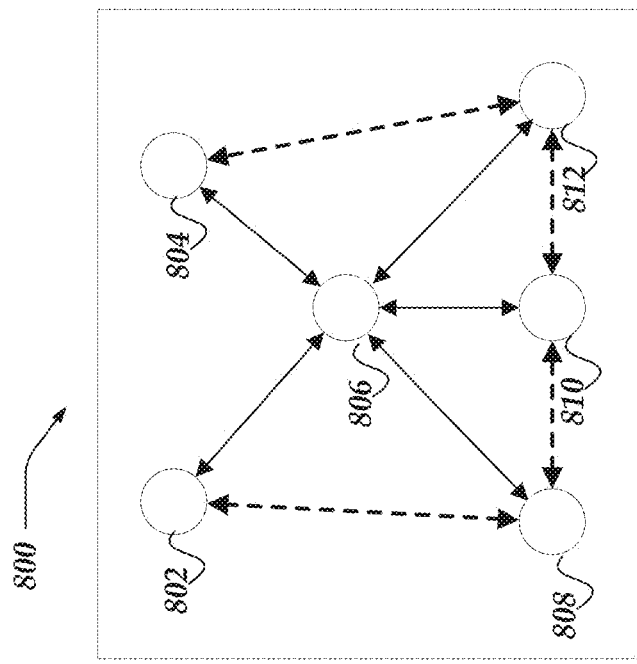
FIGS. 8A and 8B provide additional illustration of how a device relation model may evolve as the NMCs gather more information about the relationships between the agents in a network.
Figure 8A:
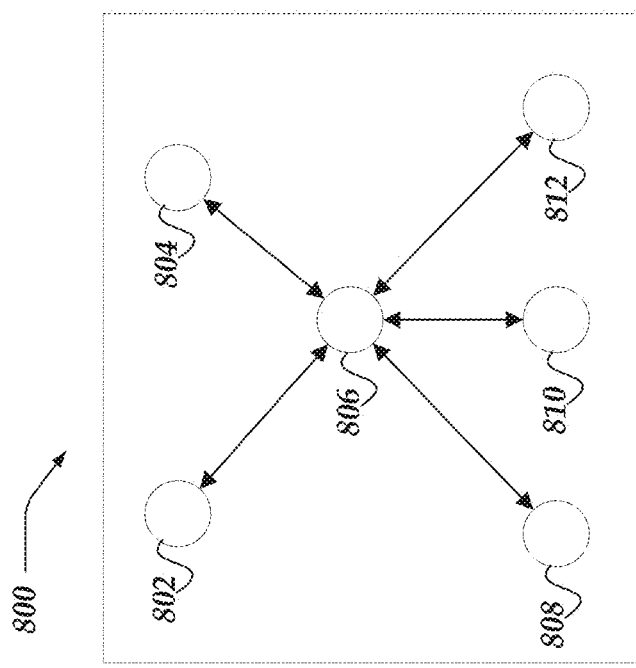

FIGS. 8A and 8B provide additional illustration of how a device relation model may evolve as the NMCs gather more information about the relationships between the agents in a network.

FIG. 8A illustrates a logical representation of device relation model 800 showing relationships between the agents based on observed network connections in accordance with the one or more embodiments. In at least one of the various embodiments, the NMC has provided device relation model 800 that represents the relationships between agent 802 through agent 812. Here device relation model 800 shows relationships that may be associated with actual network links (e.g., physical links or virtual links) between the agents in the network. For example, the edges in device relation model 800 may correspond to network flows that have been observed in the network. In some embodiments, an NMC may readily deduce these types of connection relationships by examining the source/destination fields in network packets observed in the network. Accordingly, in this example, agent 806 may have been observed exchanging data with agent 808 over the network.

FIG. 8B illustrates a logical representation of device relation model 800 showing phantom edges that represent relationships between the agents in accordance with the one or more embodiments. In some embodiments, networks may include agents that have important logical/operational relationships even though they do not exchange network packets directly with each other. Here, the NMC has discovered relationships between agent 802 and agent 808 even though they do not communicate directly with each other. Likewise, the NMC has discovered relationships between agent 804 and agent 812 even though they do not communicate directly with each other. Similarly, agent 808, agent 810, agent 812 have also been found to be related even though their no direct network link or communication between them.

In at least one of the various embodiments, the NMC may be arranged to represent such relationships using phantom edges. Phantom edges may represent relationships between agents that do not correspond to direct network links. For example, agent 802 and agent 804 may be database clients and agent 808, agent 810, and agent 812 may be database servers. In this example, agent 802 and agent 804 access the database servers through agent 806. In this example, agent 806 may be proxy-based load balancer of some kind. Accordingly, in this example there is no direct network link between the database clients and the database servers. Nor, as represented, do the database server agents (agent 808, agent 810, and agent 812) have direct connections to each other.

But, in some embodiments, the NMC may determine that the three database server agents (agent 808, agent 810, and agent 812) are related because they are each receiving communications from the same load balancer (agent 806). Likewise, the NMC may determine a relationship between the database clients (agent 802 and agent 804) and the database servers (agent 808, agent 810, and agent 812) by observing the operation of the database transactions even though they do not communicate directly with each other.

Figure 9:
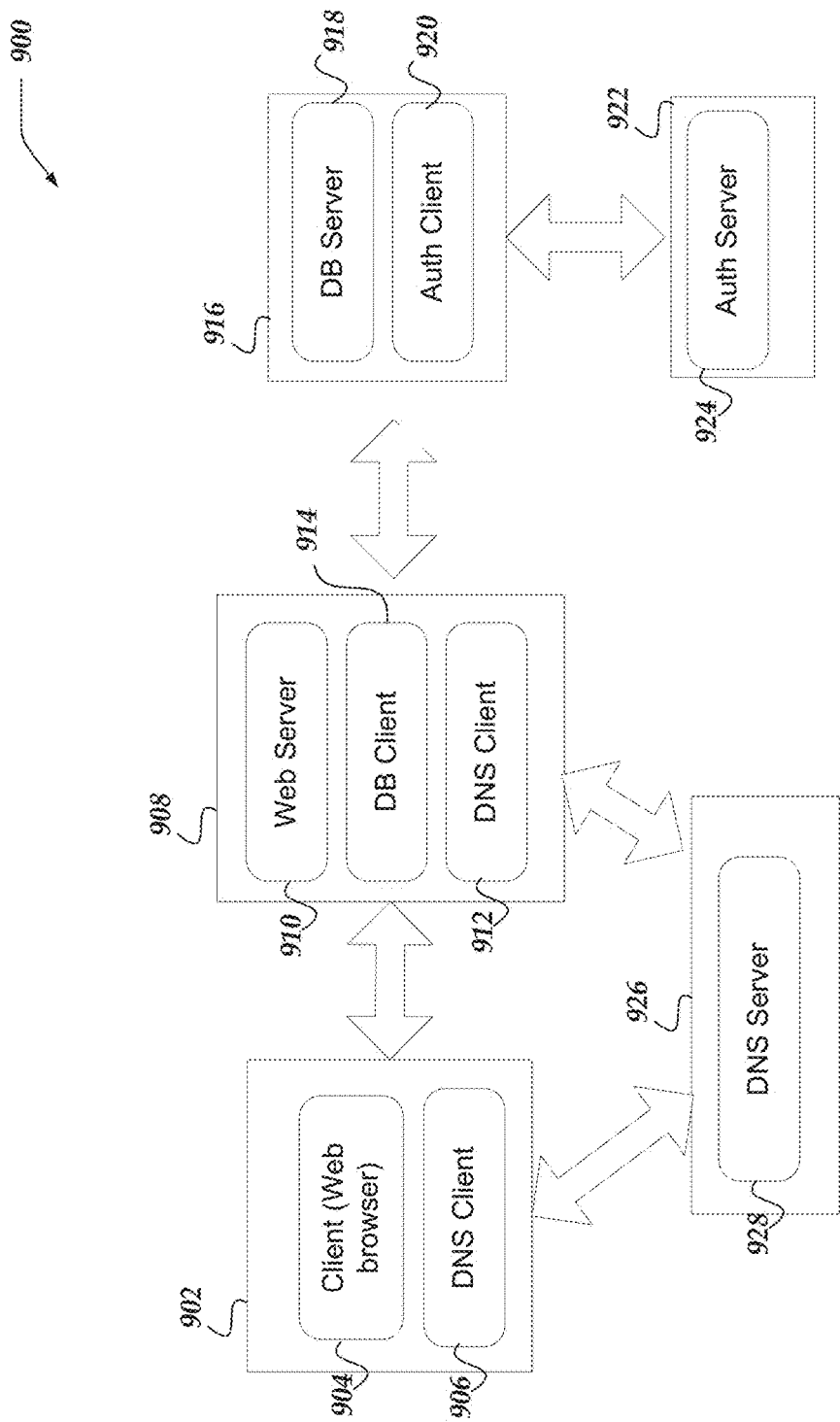
FIG. 9 illustrates a logical architecture of a network that includes agents in accordance with the one or more embodiments.

FIG. 9 illustrates a logical architecture of network 900 that includes agents in accordance with the one or more embodiments. In at least one of the various embodiments, networks may include several (100s, 1000s, or more) computers and/or devices that may put network traffic on the network. As described above with FIG. 4, network monitoring computers (NMCs) may be arranged to passively monitor the network traffic. In some embodiments, NMCs (not shown in FIG. 9) may have direct access to the wire traffic of the network enabling NMCs to access all of the network traffic in monitored networks.

In at least one of the various embodiments, the NMC may be arranged to identify agents in the network. Agents may include applications, services, programs, processes, network devices, or the like, operating in the monitored network. For example, individual agents may include, web clients, web servers, database clients, database servers, mobile app clients, payment processors, groupware clients, groupware services, or the like. In some cases, multiple agents may co-exist on the same network computer or cloud compute instance.

In this example, client computer 902 may be hosting web client 904 and DNS client 906. Further, server computer 908 may be hosting web server 910, database client 914, and DNS client 921. Also, in this example: server computer 916 may be arranged to host database server 918 and authorization client 920; server computer 922 may be arranged to host authorization server 924; and server computer 926 may be arranged to DNS server 928.

In at least one of the various embodiments, some or all of the applications on a computer may correspond to agents. Generally, applications, services, or the like, that communicate using the network may be identified as agents by an NMC. Accordingly, there may be more than one agent per computer. Some server computers may host many agents. Also, some server computers may be virtualized machine instances executing in a virtualized environment, such as, a cloud-based computing environment.

In at least one of the various embodiments, an individual process or program running on a network computer may perform more than one type of operation on the network. Accordingly, some processes or programs may be represented as more than one agent. For example, a web server application may have an embedded database client. Thus, in some embodiments, an individual web server application may contribute two or more agents to the device relation model.

In at least one of the various embodiments, the NMC may be arranged to monitor the network traffic to identify the agents and to determine their roles. In at least one of the various embodiments, the NMC may monitor the communication protocols, payloads, ports, source/destination addresses, or the like, or combination thereof, to identify agents.

In at least one of the various embodiments, the NMC may be preloaded with configuration information that it may use to identify agents and the services/roles they may be performing in the network. For example, if an NMC observes a HTTP GET request coming from a computer, it may determine there is a web client agent running on the host. Likewise, if the NMC observes a HTTP 200 OK response originating from a computer it may determine that there is a web server agent in the network.

In at least one of the various embodiments, the NMC may use some or all of the tuple information included in network traffic to distinguish between different agents in the network. Further, the NMC may be arranged to track the connections and network flows established between separate agents by correlating the tuple information of the requests and responses between the agents.

Figure 10:
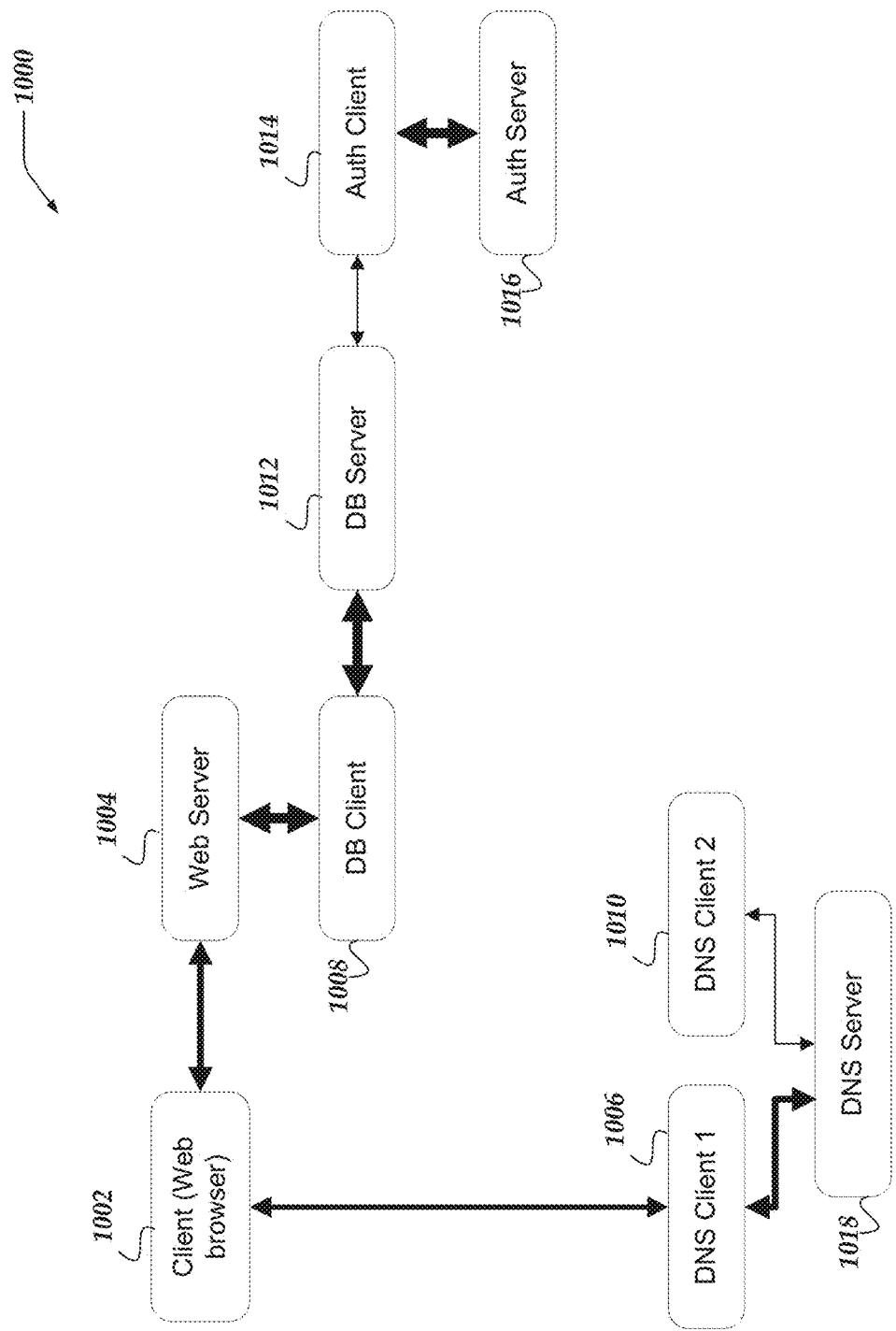
FIG. 10 illustrates a logical representation of a data structure for a device relation model that includes agents in accordance with the one or more embodiments.

FIG. 10 illustrates a logical representation of a data structure for device relation model 1000 that includes agents in accordance with the one or more embodiments. In at least one of the various embodiments, network monitoring computers (NMCs) may be arranged generate device relation models, such as, device relation model 1000. In this example, device relation model 1000 represents the agents discovered network 900 shown in FIG. 9.

In at least one of the various embodiments, as described above, NMCs may arrange device relation models to represent the relationship the agents have to each other rather than just modeling the network topology. For example, agent 1006, agent 1010, and agent 1018 are each related to the DNS system in network 900. Therefore, in this example, for some embodiments, the NMC may arrange device relation model 1000 such that all of the DNS related agents (agent 1006, agent 1010, and agent 1018) are neighbors in the graph. Accordingly, in some embodiments, even though agent 1006 corresponds to DNS client 906 on client computer 902, the NMC may group agent 1006 with the other DNS agents rather than put it next other agents in the same computer.

In at least one of the various embodiments, the NMC may be arranged to generate device relation model 1000 based on the relationships that the agents have with each other. Accordingly, in some embodiments, the edges in the graph may be selected and/or prioritized (e.g., weighted) based on the type and/or strength of the relationship. In at least one of the various embodiments, the metrics used for prioritizing the edges in a device relation model may be selected/computed based on configuration information that includes rules, conditions, pattern matching, scripts, or the like. NMCs may be arranged to apply this configuration to the observed network packets (e.g., headers and payload, alike) to identify and evaluate relationships.

In at least one of the various embodiments, in device relation model 1000, the edge connecting agent 1004 and agent 1008 is depicted thicker to represent the close relationship the web server agent has with the database client agent. This reflects that the web server may be hosting a data centric web application that fetches data from a database when it receives HTTP requests from clients. Likewise, for device relation model 1000 the relationship between the database client (agent 1008) and the database server (agent 1012) is also a strong relationship. Similarly, the relationship between the authorization client (agent 1014) and the authorization server (agent 1016) is a strong relationship.

Also, in this example, the client (agent 1002) and DNS client 1 (agent 1006) have a strong relationship and it follows that DNS client 1 (agent 1006) has a strong relationship with the DNS server (agent 1018). However, DNS client 2 (agent 1010) has a weak relationship with the DNS server (agent 1018). In this example, this may make sense because DNS client 1 (agent 1006) is often used by the client (agent 1002) to send lookup requests to the DNS server. In contrast, in this example, DNS client 2 (agent 1010) is rarely used since it is running on the server computer (server computer 908 in FIG. 9) and it may rarely issues name lookup requests.

In at least one of the various embodiments, the NMC may traverse device relation model 1000 to identify agents that may be closely related together and associate them into a group. For example, in some embodiments, in device relation model 1000, agent 1004, agent 1008, and agent 1012 may be grouped since they each have strong relationships with each other.

Accordingly, in at least one of the various embodiments, the NMC may be arranged to correlate error signals that may be associated with agent in the same to determine that an anomaly may be occurring. Related error signals that may propagate through a group of closely related agents may be recognized as a bigger problem that rises to an actual anomaly.

In at least one of the various embodiments, the NMC may be arranged to have configuration information, including, templates, patterns, protocol information, or the like, for identifying error signals in a group that may have correlations that indicate they indicate an anomaly.

In some embodiments, the NMC may be arranged to capture/monitor incoming and outgoing network traffic for agents in a monitored network. Also, the NMC may be arranged to employ facilities, such as, state machines, mathematical models, or the like, to track expected/normal operations of different types of agents in a monitored network. Accordingly, in at least one of the various embodiments, the NMC may monitor the state of operations for agents that are working together. For example, a web client agent, such as, agent 1002, may make an HTTP request to web server agent 1004, that in turn triggers the web server agent 1004 to issue a database request to DB client agent 1008 that in turn is provided database server agent 1012. In some embodiments, the NMC may monitor the operation of each agent in the group by observing the network traffic exchanged between the agents in a group. Thus, in some embodiments, if an error at database server agent 1012 causes web client agent 1002 to drop its connection because of a timeout (or the user cancel the request, or repeats the same request before the response is sent), the NMC may be able to correlate the error at database server agent 1012 with the "timeout" error at web client agent 1002 to recognize what may be a serious anomaly.

Generalized Operations

FIGS. 11-14 represent generalized operations for anomaly detection using device relationship graphs in accordance with at least one of the various embodiments. In at least one of the various embodiments, processes 1100, 1200, 1300, and 1400 described in conjunction with FIGS. 11-14 may be implemented by and/or executed by one or more processors on a single network computer (or network monitoring computer), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 11-14 may be used for anomaly detection using device relationship graphs in accordance with at least one of the various embodiments and/or architectures such as those described in conjunction with FIGS. 4-10. Further, in at least one of the various embodiments, some or all of the action performed by processes 1100, 1200, 1300, and 1400 may be executed in part by network monitoring application 322 running on one or more processors of one or more network computers.

Figure 11:
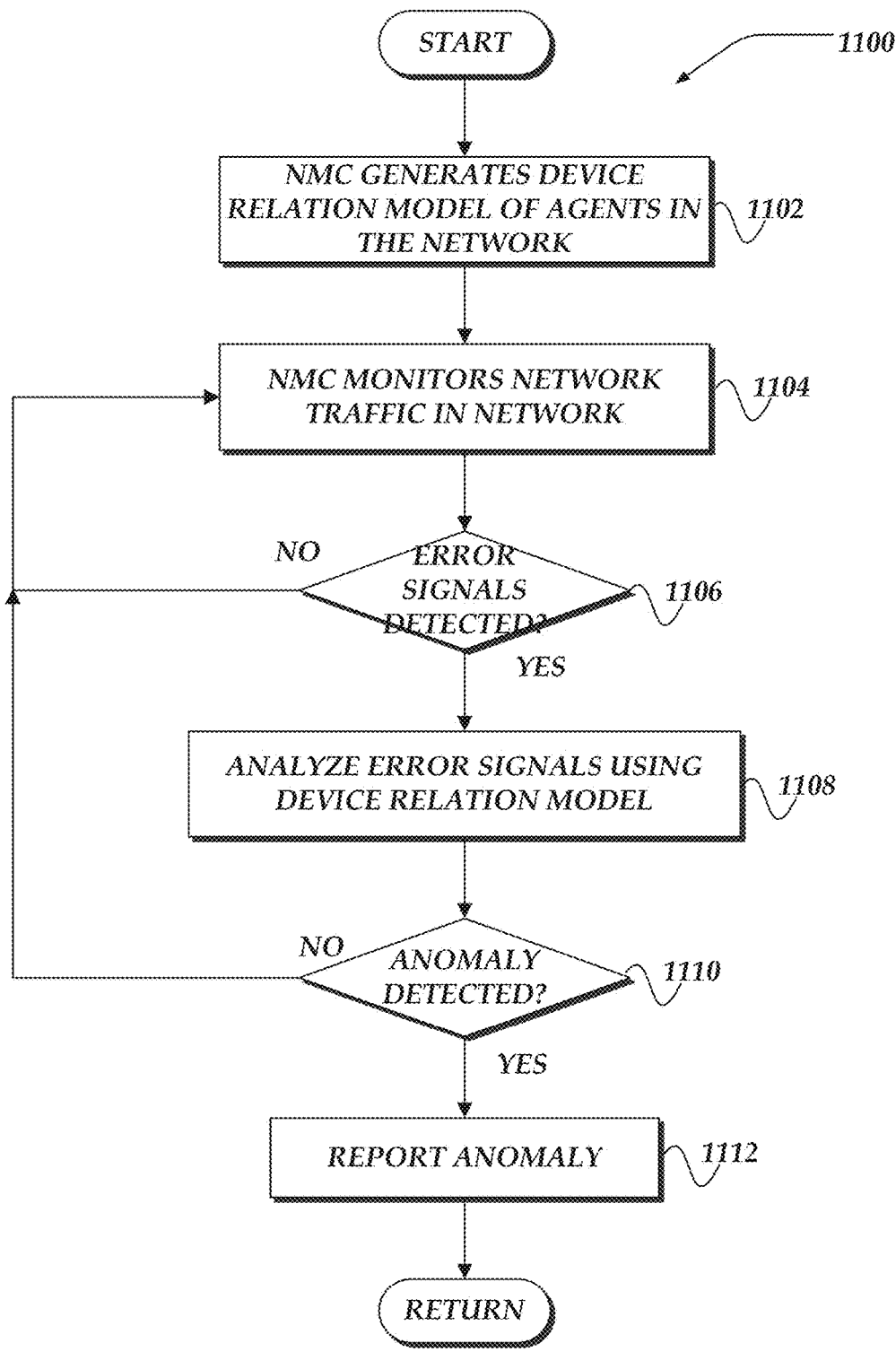
FIG. 11 illustrates an overview flowchart of a process for anomaly detection using device relationship graphs in accordance with at least one of the various embodiments.

FIG. 11 illustrates an overview flowchart of process 1100 for anomaly detection using device relationship graphs in accordance with at least one of the various embodiments. After a start block, at block 1102, in at least one of the various embodiments, the NMC may generate a device relation model of the agent in a monitored network. In at least one of the various embodiments, the NMC may be arranged to observe wire traffic on the network to identify the agents in the network. As described above, the NMC may have access to network traffic coming and going from each agent. Accordingly, the NMC may use tuple information included in the network traffic, such as source/destination addresses to identify agents in the network.

At block 1104, in at least one of the various embodiments, the NMC may continue to monitor traffic flowing through the monitored network. In at least one of the various embodiments, one or more NMCs may monitor the same networks. As more information is discovered, the NMC may learn more about the operation of the network and the operation of the agents the device relation model.

At decision block 1106, in at least one of the various embodiments, if one or more error signals are detected by the NMC, control may flow to block 1108; otherwise, control may loop back to block 1104. In at least one of the various embodiments, the NMC may be arranged to detect many events both expected and unexpected. In at least one of the various embodiments, some events may be indicative of errors. In some embodiments, these signals may be dropped connections, error codes in responses, unacknowledged requests, out of order communications, or the like, or combination thereof.

In at least one of the various embodiments, the NMC may be arranged to use configuration information, such as, rules-based policy rules, or the like, to determine if observed network traffic is associated with an error signal. For example, the configuration information may include one or more defined patterns, conditions, or the like, that may be associated with errors.

At block 1108, in at least one of the various embodiments, the NMC may be arranged to analyze the error signals using the device relation model. In at least one of the various embodiments, the NMC may be arranged to perform an analysis to determine whether one or more error signals may be correlated with an anomaly. In some embodiments, many errors signals may simply be indicative of normal operations. For example, if many of the clients communicating with a monitored network are mobile phones, it may expect that several mobile phone client may appear to spontaneously quit responding. In this example, clients dropping connections may be normal as they may often drop out of connectivity. However, for example, if clients are dropping connections because of an agent further downstream, there NMC may make this correlation and report an anomaly.

In at least one of the various embodiments, the NMC may use the device relation model to see if the observed error signals correlate to anomaly that may include more than one agent. For example, if the NMC determines the two or more related agents are sending the same error signals it may indicate a potential problem within the group of agent. Alternatively, in some embodiments, the NMC may be arranged to correlate different kinds of error signals generated by different agents to identify an anomaly.

At decision block 1110, in at least one of the various embodiments, if an anomaly is detected, control may flow to block 1112; otherwise, control may loop back to block 1104.

At block 1112, in at least one of the various embodiments, the NMC may report or otherwise generate and store a record of the anomaly. In at least one of the various embodiments, the NMC may be arranged to prioritize anomalies or otherwise, associate one or more actions that should be taken for a given anomaly. For example, some anomalies may cause a trouble ticket to be created and provided to an organization information technology teams.

In other examples, the NMC may be arranged to report other anomalies to a live dashboard user-interface, or the like.

Next, control may be returned to a calling process. In some embodiments, control may loop back to block 1104 for further monitoring of the network traffic.

Figure 12:
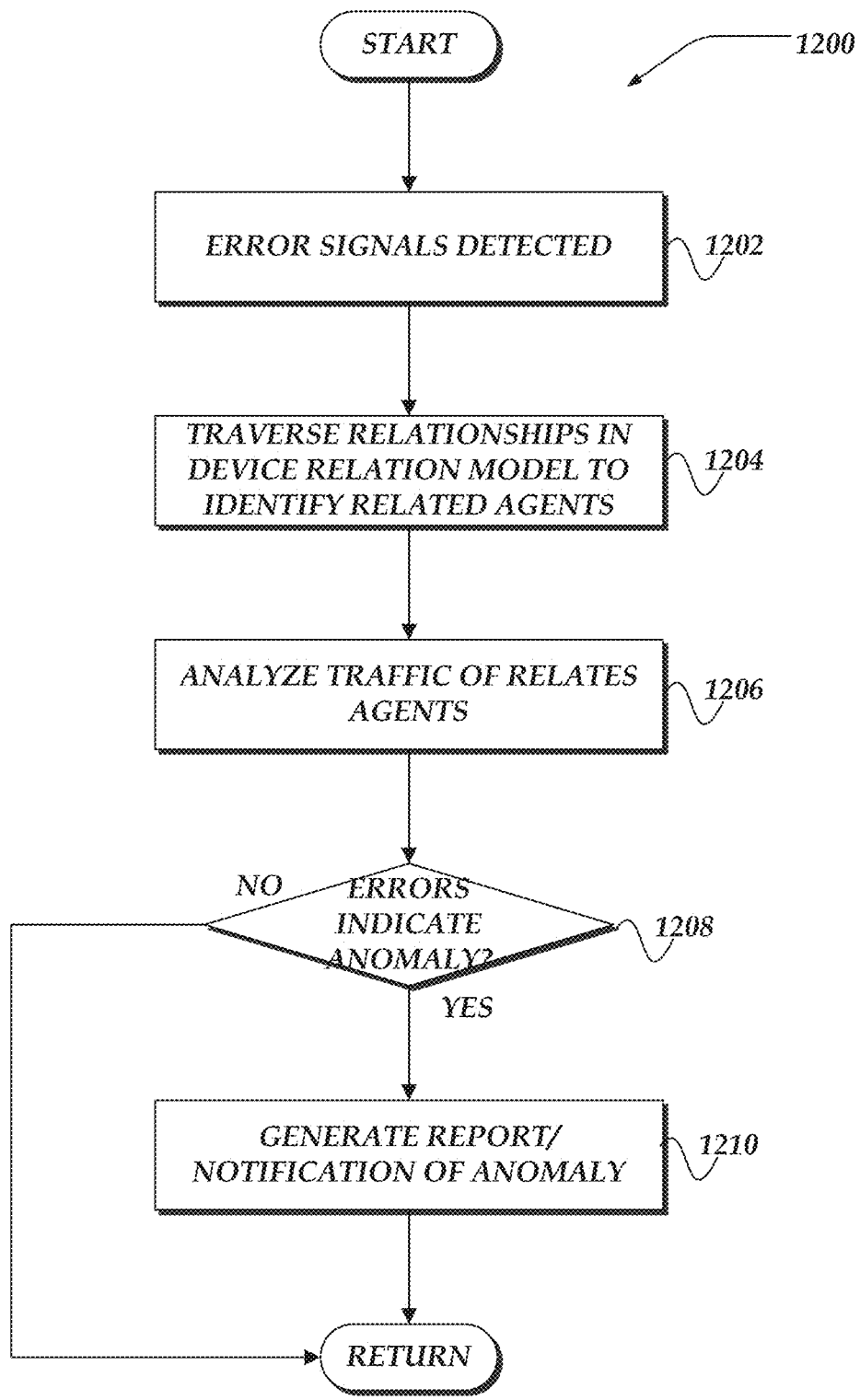
FIG. 12 illustrates a flowchart of a process for anomaly detection using device relationship graphs in accordance with at least one of the various embodiments.

FIG. 12 illustrates a flowchart of process 1200 for anomaly detection using device relationship graphs in accordance with at least one of the various embodiments. After a start block, at block 1202, in at least one of the various embodiments, the NMC may have detected one or more error signals. In at least one of the various embodiments, NMCs may be arranged to use various methods, as discussed above, to identify errors or error signals that may be occurring in the network.

At block 1204, in at least one of the various embodiments, the NMC may traverse the device relation model to identify relationships between agents to identify one or more that may be considered grouped. In at least one of the various embodiments, grouped agents or agent groups may be comprised of agents that may have been determined to have relationships that may indicate one or more operational and/or significant relationship between the agents in the group. For example, client agents and server agents for of the same network application (e.g., web applications, database applications, authorization/certification applications, and so on) may be considered grouped.

At block 1206, in at least one of the various embodiments, the NMC may analyze the network traffic that may be associated with the grouped agents. In at least one of the various embodiments, the NMC may be arranged to analyze the network traffic associated with each individual group to determine if the error signals from individual agents in the group are correlated to the operations/applications the group as a whole performing.

In at least one of the various embodiments, the NMC may chain together events and error signals to see if the errors may be related because the entire group is failing. For example, the NMC may analyze network traffic to determine if seemingly insignificant error signals (e.g., occasional timeouts, retries, resends, resets, checksum errors, or the like) may actually be representative of a larger anomaly that may be affecting one or more agents in the monitored network. As described, as client timing out for one application (e.g., a web server) may actually be caused by a failure at another application (e.g., a downstream database server). Accordingly, by analyzing error signals in the context of a group of agents, the NMC may identify one or more root causes of anomalies that may otherwise be difficult to identify.

For example, if the NMC is flooded with many time out or connection failure error signals from different agents in the network, absent group-level analysis, it may be difficult to determine the root cause of the failure, such as, the failure of an important downstream or upstream resources.

At decision block 1208, in at least one of the various embodiments, if the errors indicate an anomaly, control may flow to block 1210; otherwise, control may be returned to a calling process. As described above, in at least one of the various embodiments, the NMC may include configuration information that may be used to identify the conditions that correspond to the occurrence of various anomalies. Accordingly, if the error signals are determined to match the conditions for an anomaly, the NMC may signal that a particular anomaly has occurred or is occurring.

In at least one of the various embodiments, the relationships between the agents emitting error signals may be analyzed to identify one or more upstream errors that may be triggering many downstream error signals. Accordingly, if the NMC identifies this dependency, the downstream error signal may be considered subsumed by a single anomaly. Thus, in some embodiments, the NMC may indicate the source of the downstream errors as the anomaly rather than reporting the downstream errors separately.

Likewise, in at least one of the various embodiments, one or more anomalies detected in other parts of the network may be determined to be dependent and/or caused by one or more other anomalies. Accordingly, dependent anomalies may be hidden/suppressed since they may be caused by one or more upstream anomalies.

At block 1210, in at least one of the various embodiments, the NMC may generate a report and/or notifications regarding the detected one or more anomalies. Accordingly, in at least one of the various embodiments, the NMC may be arranged to collapse large number of apparent error signals to a smaller number of actual anomalies using based on device relationship model. For example, in large networks, this may result in thousands of error signals being collapsed one anomaly corresponding to a single point of failure. Next, control may be returned to a calling process.

Figure 13:
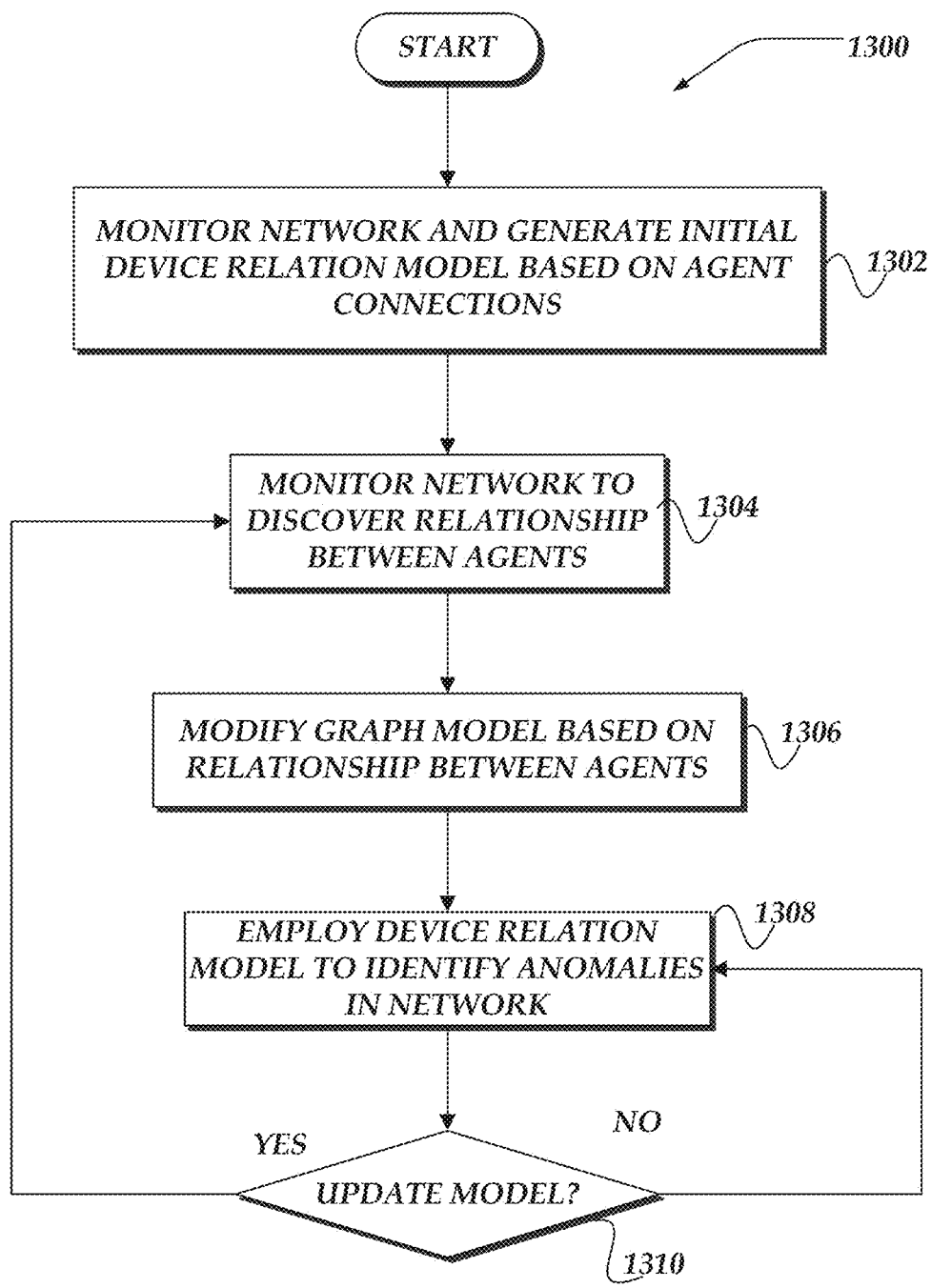
FIG. 13 illustrates a flowchart of a process for modeling agent relationships using device relation model in accordance with at least one of the various embodiments.

FIG. 13 illustrates a flowchart of process 1300 for modeling agent relationships using device relation model in accordance with at least one of the various embodiments. After a start block, at block 1302, in at least one of the various embodiments, the network monitoring computer (NMC) may monitor the network generating an initial device relation model based on observed connections between agents. In at least one of the various embodiments, the NMC may make initial determination of agents and relationship based on the source/destination addresses observed in network traffic on the network. In at least one of the various embodiments, this information enables the NMC to identify agents in the network and begin constructing a rudimentary device relation model of the relationships between them.

At block 1304, in at least one of the various embodiments, the NMC may monitor the network to discover relationships between the agents. In at least one of the various embodiments, the NMC may be arranged to continuously monitor the network traffic to uncover more details about the network and the agents in the network. As described above, the NMC may correlate information from the different OSI layers and/or different agents to discover the roles of agents and their relationships to other agents. In some embodiments, some relationships may be indicative that two or more agents may be working together as a group to provide services.

At block 1306, in at least one of the various embodiments, the NMC may modify the device relation model based on discovered relationship between the agents. In at least one of the various embodiments, the NMC may be configured to continuously update the relationships represented in the device relation model. In at least one of the various embodiments, this may involve prioritizing existing relationships, de-prioritizing existing relationships, removing/hiding relationships, adding new relationships, or the like, or combination thereof. In some embodiments, removing or hiding a relationship may include removing or hiding its associated edge from the device relation model.

At block 1308, in at least one of the various embodiments, the NMC may employ the device relation model to identify anomalies in the network. In at least one of the various embodiments, as the device relation model is updated the NMC may continue use it for anomaly detection as described above. In some embodiments, the NMC may be arranged to maintain a working copy of the device relation model separate from the model that is being updated such that the working copy may be archived or discarded with the updated device relation model is ready for use.

In at least one of the various embodiments, the NMC may be arranged update portions of the device relation model as new information may be determined. Likewise, in some embodiments, the NMC may be arranged to add new agents to the device relation model if some are discovered. Also, in at least one of the various embodiments, agents may be removed or hidden after a defined period of inactivity.

At decision block 1310, in at least one of the various embodiments, if the device relation model should be updated, control may loop back to block 1304; otherwise, control may loop back block 1308. In at least one of the various embodiments, the NMC may be arranged to have timeout defined that upon expiry triggers the NMC to update the device relation model. In at least one of the various embodiments, the NMC may be arranged to employ configuration information defines various conditions and/or metrics that if may trigger an update of the device relation model. For example, conditions may include, an observed increase in network traffic that exceeds a defined threshold, likewise, an increase in agents, an increase in non-anomaly related error signals, new applications being detected, or the like, or combination thereof. However, in some embodiments, the device relation model may be updated continuously as the NMC monitors the network.

In at least one of the various embodiments, one or more NMCs may be dedicated to maintain the device relation model. Likewise, in some embodiments, some or all of the monitored network traffic may be captured and analyzed separately from the monitoring operations. In at least one of the various embodiments, monitoring may continue until a user disables the NMC from monitoring the network.

Figure 14:
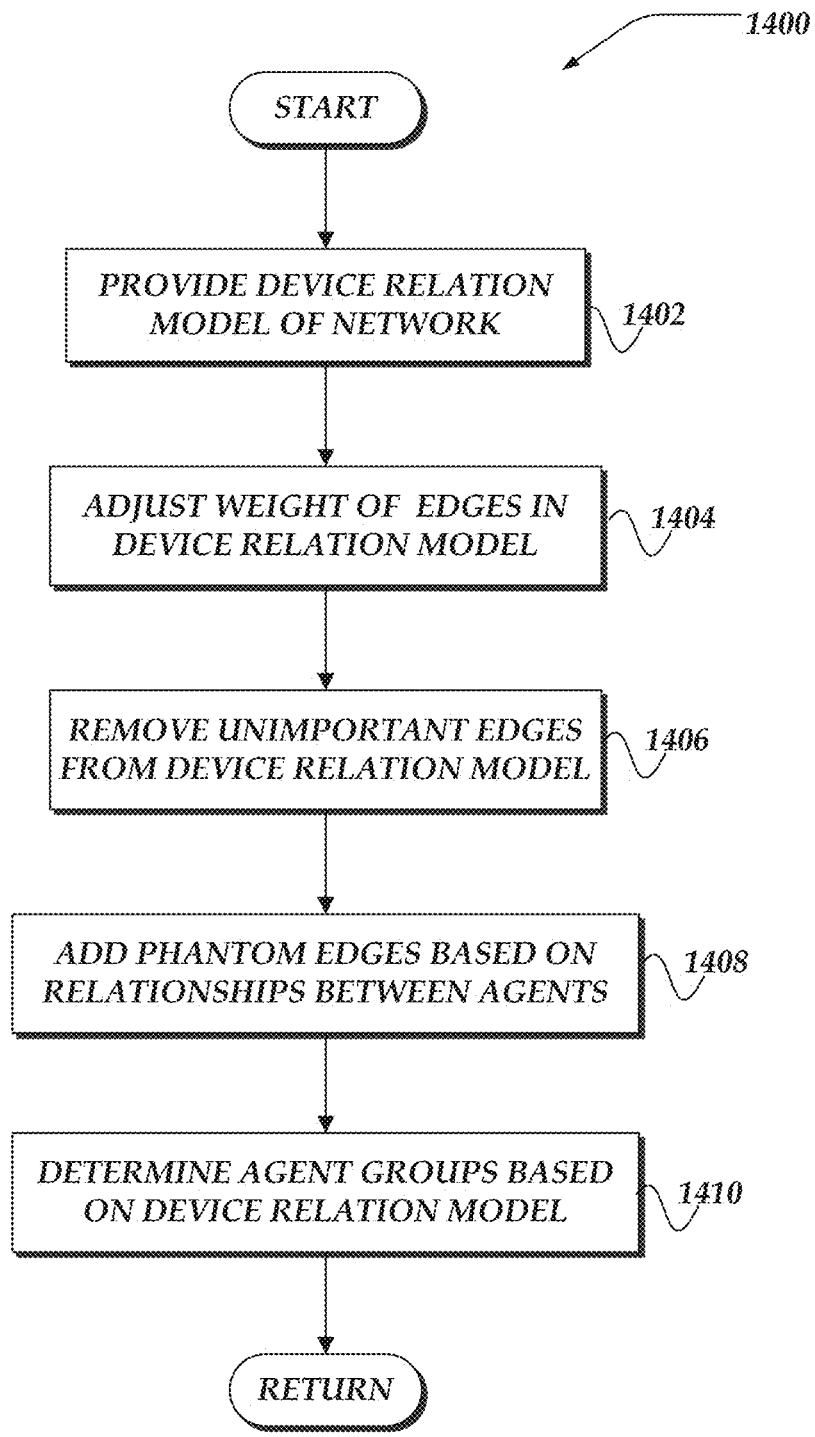
FIG. 14 illustrates a flowchart of a process for modeling agent relationships using device relation model in accordance with at least one of the various embodiments.

FIG. 14 illustrates a flowchart of process 1400 for modeling agent relationships using device relation model in accordance with at least one of the various embodiments. After a start block, at block 1402, in at least one of the various embodiments, the NMC may be provided a device relation model. In at least one of the various embodiments, an NMC may be provided a new device relation model or it may be provided a device relation model that may have been revised one or more times.

At block 1404, in at least one of the various embodiments, the NMC may adjust the weights of edges in the device relation model. As described above, in at least one of the various embodiments, the NMC may analyze monitored network traffic to identify relationships as well as the quality of the relationships. Further, in some embodiments, the NMC may be arranged to adjust the weights and/or priority of different relationships between agents in the network based on the monitored network traffic. Accordingly, the NMC may modify meta-data associated with edges in the graph to reflect the weight and/or priority of corresponding relationships.

At block 1406, in at least one of the various embodiments, the NMC may remove unimportant edges from the device relation model. In at least one of the various embodiments, relationships that initially seemed more important may be removed or hidden from the device relation model. In some embodiments, if a device relation model is initially created, it may include edges connecting every agent that participate in network traffic observed on the monitored network. Accordingly, overtime, the NMC may determine that one or more of those initial relationships may be weak or unimportant. For example, a watchdog agent arranged to validate the health of agents on the network may be detected broadcasting periodic heartbeat and receiving responses from many agents. Initially, this may result in the NMC generating edges in the graph connecting each responding agent to the watchdog agent. However, in at least one of the various embodiments, overtime it may be clear that the watchdog agent does not have direct/significant relationships with all the agents that answered the heartbeat request ping. Accordingly, in at least one of the various embodiments, the NMC may be arranged to minimize the importance of certain relationships with the watchdog agent unless there is more activity than responding to heartbeat pings.

In at least one of the various embodiments, the NMC may include configuration information that explicitly filters or excludes some types of network traffic and/or agents from contributing to the device relation model. For example, the NMC may be configured to exclude one or more NMCs, traffic monitoring computers, certain types/patterns of network traffic, applications, endpoints, network addresses, or the like, or combination thereof, from being included in the device relation model.

In at least one of the various embodiments, removing less important edges from the device relation model simplifies the device relation model and improves the operation of the NMCs. Simplifying the device relation model at least enables improved traversal performance because the graph is smaller and less complex as well as reducing the memory footprint of the device relation model.

At block 1408, in at least one of the various embodiments, the NMC may add one or more phantom edges to the device relation model based on relationships between one or more agents in the network. As described above, the NMC may be arranged to generate a device relation model that models relationships between agents in the network rather just modeling connections and/or network topology. In some embodiments, the NMC may discover relationships between/among agents that may not have established direct connections with other or directly exchanged network traffic with each other. Accordingly, anomalies may be associated with agents that may not be providing or generating error signals based on phantom edges that indicate a relationship with other agents that may be emitting error signals.

In at least one of the various embodiments, to account for these relationships the NMC may include one or more phantom edges in the device relation model that represent relationships between agents that may be otherwise unconnected. For example, in at least one of the various embodiments, web servers may be behind a load balancing proxy server that accepts web client requests that it forwards to one of a cluster of web servers. The web server may establish a network connection with the load balancer and then send it a response to the client's request. Then the load balancer may send the response to the client. In this example, the request/response network traffic does not travel directly between the web clients and the web server because the load balancer is disposed in between the web clients and the web servers. However, in at least one of the various embodiments, the NMC may be arranged to include configuration information, such as, traffic patterns, heuristics, or the like, that enable it to associate the response traffic from the web server agents with the request traffic from the web client agents. Thus, the NMC may establish relationships between the web clients and the web servers as well as between the different web servers in the cluster.

Similarly, for example, a network device may be disposed between a cluster of database servers to shard/partition (e.g., distribute) database requests among the database servers.

For example, field included the network traffic, such as a user identifier may be hashed to produce a bucketing index value that may be used for selecting a particular database server. Thus, even though the database servers are closely related they may not share much traffic. Accordingly, the NMC may observe that the each of the database servers in the group are database server agents that may be exchanging content directly or indirectly with database clients. Accordingly, the NMC may determine that the database servers should be considered related even though they may not communicate often with each.

At block 1410, in at least one of the various embodiments, the NMC may analyze the relationships as depicted by the device relation model to identify agent groups. As described above, the NMC may analyze network traffic and/or relationships in the device relation model to identify two or more agents that should be associated with each other in a group. In at least one of the various embodiments, an agent may be a member of zero or more groups that same time. In at least one of the various embodiments, the criteria for assigning an agent to a group may be defined in configuration information. In some embodiments, there may be a defined set of types of groups that may be looked for, such as, web applications that include web servers and database servers, service clusters (e.g., load balanced servers), or the like. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In at least one embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for monitoring network traffic in a network, wherein one or more processors in a network computer execute instructions to perform actions, comprising:
   providing a device relation model that is comprised of a graph for two or more nodes and one or more edges stored in memory of the network computer, wherein each node represents an agent and each edge represents a relationship between two agents; and
   instantiating a network monitoring application to perform actions, including:
      detecting one or more error signals;
      employing network traffic from two or more non-associated agents that is correlated to add one or more phantom edges to the device relation model to associate the two or more non-associated agents with each other;
      traversing the device relation model to identify one or more agents that are associated with the one or more error signals and that are associated with each other in the device relation model;
      analyzing the network traffic associated with the one or more error signals and the one or more agents to identify a plurality of anomalies that correspond to more than one agent that is associated with a same error signal;
      reducing an amount of the plurality of anomalies into one or more anomalies based on the graph of the device relation model; and
      employing the one or more anomalies in the network traffic to update the device relation model and notifying a user of the one or more anomalies in the network.

2. The method of claim 1, wherein providing the device relation model, further comprises:
   adding one or more nodes to the device relation model based on the network traffic, wherein the one or more nodes each represent an agent in the network; and
   adding one or more edges to the device relation model based on the network traffic, wherein the one or more edges correspond to an association between two agents.

3. The method of claim 1, wherein providing the device relation model further comprises:
   providing one or more weight values that are associated with the one or more edges, wherein the one or more weight values indicate a strength of an association between two agents; and
   removing one or more of the one or more edges from the device relation model that are associated with a weight value that is less than a defined threshold.

4. The method of claim 1, further comprising, updating the device relation model based on the network, wherein the device relation model is updated upon a discovery of one or more of new computing devices in the network, new applications in the network, or new associations between agents.

5. The method of claim 1, wherein providing the device relation model, further comprises:

associating the one or more agents with applications based on their network traffic; and assigning the one or more agents to one or more groups based on their network traffic and their associated applications.

6. The method of claim 1, wherein analyzing the network traffic further comprises:

comparing a portion of the error signals that are associated with one or more of the one or more agents with another portion of the error signals that are associated with one or more other agents of the one or more agents; and associating the one or more error signals with the one or more anomalies of the network traffic based on a result of the comparison.

7. The method of claim 1, further comprising, when one or more of the one or more anomalies in the network traffic are caused by error signals associated with one or more upstream anomalies, discarding the one or more anomalies caused by the error signals associated with the one or more upstream anomalies.

8. A system for monitoring network traffic in a network comprising:

a network computer, comprising:
  a transceiver that communicates over the network;
  a memory that stores at least instructions; and
  one or more processors that execute instructions that perform actions, including:
    providing a device relation model that is comprised of a graph for two or more nodes and one or more edges stored in memory of the network computer, wherein each node represents an agent and each edge represents a relationship between two agents; and
    instantiating a network monitoring application to perform actions, including:
      detecting one or more error signals;
      employing network traffic from two or more non-associated agents that is correlated to add one or more phantom edges to the device relation model to associate the two or more non-associated agents with each other;
      traversing the device relation model to identify one or more agents that are associated with the one or more error signals and that are associated with each other in the device relation model;
      analyzing the network traffic associated with the one or more error signals and the one or more agents to identify a plurality of anomalies that correspond to more than one agent that is associated with a same error signal;
      reducing an amount of the plurality of anomalies into one or more anomalies based on the graph of the device relation model; and
      employing the one or more anomalies in the network traffic to update the device relation model and notifying a user of the one or more anomalies in the network; and a client computer, comprising:
  a transceiver that communicates over the network;
  a memory that stores at least instructions; and
  one or more processors that execute instructions that perform actions, including:
    providing one or more portions of the network traffic to the network.

9. The system of claim 8, wherein providing the device relation model, further comprises:

adding one or more nodes to the device relation model based on the network traffic, wherein the one or more nodes each represent an agent in the network; and adding one or more edges to the device relation model based on the network traffic, wherein the one or more edges correspond to an association between two agents.

10. The system of claim 8, wherein providing the device relation model further comprises:

providing one or more weight values that are associated with the one or more edges, wherein the one or more weight values indicate a strength of an association between two agents; and removing one or more of the one or more edges from the device relation model that are associated with a weight value that is less than a defined threshold.

11. The system of claim 8, wherein the network computer's one or more processors execute instructions that perform actions, further comprising, updating the device relation model based on the network, wherein the device relation model is updated upon a discovery of one or more of new computing devices in the network, new applications in the network, or new associations between agents.

12. The system of claim 8, wherein providing the device relation model, further comprises:

associating the one or more agents with applications based on their network traffic; and assigning the one or more agents to one or more groups based on their network traffic and their associated applications.

13. The system of claim 8, wherein analyzing the network traffic further comprises:

comparing a portion of the error signals that are associated with one or more of the one or more agents with another portion of the error signals that are associated with one or more other agents of the one or more agents; and associating the one or more error signals with the one or more anomalies of the network traffic based on a result of the comparison.

14. The system of claim 8, wherein the network computer's one or more processors execute instructions that perform actions, further comprising, when one or more of the one or more anomalies in the network traffic are caused by error signals associated with one or more upstream anomalies, discarding the one or more anomalies caused by the error signals associated with the one or more upstream anomalies.

15. A processor readable non-transitory storage media that includes instructions for monitoring network traffic in a network, wherein execution of the instructions by one or more processors performs actions, comprising:

providing a device relation model that is comprised of a graph for two or more nodes and one or more edges stored in memory of the network computer, wherein each node represents an agent and each edge represents a relationship between two agents; and instantiating a network monitoring application to perform actions, including:
  detecting one or more error signals;
  employing network traffic from two or more non-associated agents that is correlated to add one or more phantom edges to the device relation model to associate the two or more non-associated agents with each other;
  traversing the device relation model to identify one or more agents that are associated with the one or more error signals and that are associated with each other in the device relation model;

analyzing the network traffic associated with the one or more error signals and the one or more agents to identify a plurality of anomalies that correspond to more than one agent that is associated with a same error signal;

reducing an amount of the plurality of anomalies into one or more anomalies based on the graph of the device relation model; and employing the one or more anomalies in the network traffic to update the device relation model and notifying a user of the one or more anomalies in the network.

16. The media of claim 15, wherein providing the device relation model, further comprises:

adding one or more nodes to the device relation model based on the network traffic, wherein the one or more nodes each represent an agent in the network; and adding one or more edges to the device relation model based on the network traffic, wherein the one or more edges correspond to an association between two agents.

17. The media of claim 15, wherein providing the device relation model further comprises:

providing one or more weight values that are associated with the one or more edges, wherein the one or more weight values indicate a strength of an association between two agents; and removing one or more of the one or more edges from the device relation model that are associated with a weight value that is less than a defined threshold.

18. The media of claim 15, further comprising, updating the device relation model based on the network, wherein the device relation model is updated upon a discovery of one or more of new computing devices in the network, new applications in the network, or new associations between agents.

19. The media of claim 15, wherein providing the device relation model, further comprises:

associating the one or more agents with applications based on their network traffic; and assigning the one or more agents to one or more groups based on their network traffic and their associated applications.

20. The media of claim 15, wherein analyzing the network traffic further comprises:

comparing a portion of the error signals that are associated with one or more of the one or more agents with another portion of the error signals that are associated with one or more other agents of the one or more agents; and associating the one or more error signals with the one or more anomalies of the network traffic based on a result of the comparison.

21. A network computer for monitoring network traffic in a network, comprising:

a transceiver that communicates over the network;
a memory that stores at least instructions; and
one or more processors that execute instructions that perform actions, including:

providing a device relation model that is comprised of a graph for two or more nodes and one or more edges stored in memory of the network computer, wherein each node represents an agent and each edge represents a relationship between two agents; and instantiating a network monitoring application to perform actions, including:

detecting one or more error signals;

employing network traffic from two or more non-associated agents that is correlated to add one or more phantom edges to the device relation model to associate the two or more non-associated agents with each other;

traversing the device relation model to identify one or more agents that are associated with the one or more error signals and that are associated with each other in the device relation model;

analyzing the network traffic associated with the one or more error signals and the one or more agents to identify a plurality of anomalies that correspond to more than one agent that is associated with a same error signal;

reducing an amount of the plurality of anomalies into one or more anomalies based on the graph of the device relation model; and employing the one or more anomalies in the network traffic to update the device relation model and notifying a user of the one or more anomalies in the network.

22. The network computer of claim 21, wherein providing the device relation model, further comprises:

adding one or more nodes to the device relation model based on the network traffic, wherein the one or more nodes each represent an agent in the network; and adding one or more edges to the device relation model based on the network traffic, wherein the one or more edges correspond to an association between two agents.

23. The network computer of claim 21, wherein providing the device relation model further comprises:

providing one or more weight values that are associated with the one or more edges, wherein the one or more weight values indicate a strength of an association between two agents; and removing one or more of the one or more edges from the device relation model that are associated with a weight value that is less than a defined threshold.

24. The network computer of claim 21, further comprising, updating the device relation model based on the network, wherein the device relation model is updated upon a discovery of one or more of new computing devices in the network, new applications in the network, or new associations between agents.

25. The network computer of claim 21, wherein providing the device relation model, further comprises:

associating the one or more agents with applications based on their network traffic; and assigning the one or more agents to one or more groups based on their network traffic and their associated applications.

26. The network computer of claim 21, wherein analyzing the network traffic further comprises:

comparing a portion of the error signals that are associated with one or more of the one or more agents with another portion of the error signals that are associated with one or more other agents of the one or more agents; and associating the one or more error signals with the one or more anomalies of the network traffic based on a result of the comparison.

* * * * *

UNITED STATES PATENT AND TRADEMARK OFFICE
CERTIFICATE OF CORRECTION

Page 1 of 2

PATENT NO.         : 9,729,416 B1
APPLICATION NO.    : 15/207213
DATED              : August 8, 2017
INVENTOR(S)        : Khanal et al.

It is certified that error appears in the above-identified patent and that said Letters Patent is hereby corrected as shown below:

On the Title Page

On Page 3, in item (56), under "OTHER PUBLICATIONS", in Column 1, Line 14, delete "Arindurn" and insert -- Arindum --, therefor.

In the Drawings

In Fig. 12, Sheet 12 of 14, in Step "1206", Line 1, delete "RELATES" and insert -- RELATED --, therefor.

In Fig. 13, Sheet 13 of 14, in Step "1306", Line 1, delete "GRAPH" and insert -- DEVICE RELATION --, therefor.

In the Specification

In Column 4, Line 11, delete "Universal" and insert -- User --, therefor.

In Column 5, Line 4, delete "herein the" and insert -- herein, the --, therefor.

In Column 5, Line 7, delete "VIOP," and insert -- VOIP, --, therefor.

In Column 6, Line 5, delete "NMD" and insert -- NMC --, therefor.

In Column 6, Line 21, delete "TCP/IP (IP)" and insert -- TCP/IP --, therefor.

In Column 10, Line 36, delete "(4G)" and insert -- (4G), --, therefor.

In Column 10, Line 44, delete "Mobil" and insert -- Mobile --, therefor.

Signed and Sealed this
Fourth Day of June, 2019

Andrei Iancu
*Director of the United States Patent and Trademark Office*

CERTIFICATE OF CORRECTION (continued)
U.S. Pat. No. 9,729,416 B1

In Column 10, Line 46, delete "Data GSM Environment" and insert -- Data rates for GSM Evolution --, therefor.

In Column 11, Line 39, delete "include include" and insert -- include --, therefor.

In Column 12, Lines 3-4, delete "global positioning systems (GPS) receiver 258," and insert -- global positioning systems (GPS) transceiver 258, --, therefor.

In Column 12, Line 24, delete "mobile" and insert -- Global system for mobile --, therefor.

In Column 12, Line 26, delete "SIP/RTP, GPRS," and insert -- SIP/RTP, --, therefor.

In Column 12, Line 31, delete "(MC)." and insert -- (NIC). --, therefor.

In Column 17, Lines 38-39, delete "Data storage 410" and insert -- Data storage 310 --, therefor.

In Column 18, Line 42, delete "may be employ" and insert -- may be employed --, therefor.

In Column 23, Line 20, delete "DNS client 921." and insert -- DNS client 912. --, therefor.

In Column 27, Line 23, delete "for of" and insert -- of --, therefor.

In the Claims

In Column 33, Line 23, in Claim 8, delete "a network" and insert -- a network, --, therefor.